United States Patent
Ghiringhelli et al.

(10) Patent No.: US 10,641,961 B2
(45) Date of Patent: May 5, 2020

(54) OPTICAL FIBRE AND OPTICAL FIBRE DEVICE

(71) Applicant: SPI Lasers UK Limited, Hedge End (GB)

(72) Inventors: Fabio Ghiringhelli, Southampton (GB); Mikhail Nickolaos Zervas, Southampton (GB); Julia Helen Shaw, Bramshaw (GB); Andrew Marshall, Andover (GB)

(73) Assignee: SPI Lasers UK Limited, Hedge End (GB)

( * ) Notice: Subject to any disclaimer, the term of this patent is extended or adjusted under 35 U.S.C. 154(b) by 0 days.

(21) Appl. No.: 16/301,342

(22) PCT Filed: May 24, 2017

(86) PCT No.: PCT/GB2017/000082
§ 371 (c)(1),
(2) Date: Nov. 13, 2018

(87) PCT Pub. No.: WO2017/203193
PCT Pub. Date: Nov. 30, 2017

(65) Prior Publication Data
US 2019/0196104 A1 Jun. 27, 2019

(30) Foreign Application Priority Data

May 25, 2016 (GB) .................................... 1609278.5

(51) Int. Cl.
*G02B 6/255* (2006.01)
*G02B 6/036* (2006.01)
*G02B 6/02* (2006.01)

(52) U.S. Cl.
CPC ........... *G02B 6/2551* (2013.01); *G02B 6/021* (2013.01); *G02B 6/03611* (2013.01);
(Continued)

(58) Field of Classification Search
CPC .... G02B 6/021; G02B 6/2551; G02B 6/2552; G02B 6/03611; G02B 6/03622; G02B 6/03694
See application file for complete search history.

(56) References Cited

U.S. PATENT DOCUMENTS 5,381,503 A 1/1995 Kanamori et al.
6,336,749 B1 * 1/2002 O'Toole ............... G02B 6/2551
385/96

(Continued)

FOREIGN PATENT DOCUMENTS

EP 1343032 A1 9/2003

*Primary Examiner* — Daniel Petkovsek
(74) *Attorney, Agent, or Firm* — Iandiorio Teska & Coleman, LLP

(57) ABSTRACT

An optical fibre (10) which has a first refractive index profile (61) that can be changed by heating to a second refractive index profile (62), at least one first dopant (7) for providing the first refractive index profile, at least one concealed dopant (8), and at least one mobile dopant (9), wherein the mobile dopant has a molar refractivity and is present in a concentration (19) such as to balance a change (146) in the first refractive index profile induced by the concealed dopant, and has a diffusion constant (16) greater than a diffusion constant (15) of the concealed dopant, so that heating of the optical fibre causes the mobile dopant to diffuse more quickly than the concealed dopant, thereby allowing the concealed dopant and the mobile dopant to change the first refractive index profile to the second refractive index profile.

42 Claims, 22 Drawing Sheets

(52) U.S. Cl.
CPC ..... *G02B 6/03622* (2013.01); *G02B 6/03694* (2013.01); *G02B 6/2552* (2013.01)

(56) References Cited

U.S. PATENT DOCUMENTS

| | | | |
|---|---|---|---|
| 6,512,873 B1 * | 1/2003 | Fokine | C03C 25/002 385/124 |
| 6,742,939 B2 * | 6/2004 | Sykora | C03C 3/06 385/123 |
| 7,346,258 B2 * | 3/2008 | Ikeda | C03C 13/046 385/144 |
| 2003/0012526 A1 | 1/2003 | Riis et al. | |

* cited by examiner

OPTICAL FIBRE AND OPTICAL FIBRE DEVICE

FIELD OF INVENTION

This invention relates to an optical fibre, and to an optical fibre device comprising the optical fibre. More especially, the invention relates to an optical fibre which has a first refractive index profile that can be changed by heating to a second refractive index profile, and so change an optical guidance property of the optical fibre such that the optical fibre can be used in different optical devices having different requirements. The invention may be used to simplify splicing between dissimilar optical fibres that are used in high power laser applications. More specifically, the invention enables splicing of the optical fibre to a second optical fibre having a different mode field diameter or a different optical power distribution without tapering the outside cladding. The second optical fibre may be, for example, part of an optical amplifier, a laser, or a master oscillator power amplifier.

BACKGROUND TO THE INVENTION

High power lasers have important applications in the laser processing of industrial materials. Pulsed lasers, with peak powers exceeding 10 kW, are used in marking, engraving, cuffing, welding, and drilling applications. Continuous wave lasers with powers exceeding 500 W are used in cutting and welding applications. These high power lasers typically comprise more than one specialist optical fibre that have dissimilar optical properties. It is often difficult to make low optical loss splices between such fibres reliably.

High power industrial fibre lasers use amplifying optical fibres as the gain medium. For many applications, good beam quality is desired, and thus the amplifying optical fibres need to output single-mode or low-moded laser radiation. In order to achieve high power (>1 kW) and high peak powers (>10 kW), the amplifying fibre needs to be a large mode area fibre to reduce non-linear effects. This is especially the case in picosecond (ps) lasers which can have peak powers exceeding 100 kW. Such large mode area fibres are multimoded and are configured in the laser to output single mode radiation. Such fibres can have larger mode field diameters than fibres that connect with them, and thus tapering between the different fibre types is often required in order to achieve low loss splices. Additionally, certain amplifying fibres can experience photodarkening whereby the attenuation of the amplifying fibre increases over time. Elimination of photodarkening places constraints on dopant selection and dopant concentration within the amplifying fibre.

High power industrial lasers advantageously have optical fibre beam delivery systems for delivering the laser radiation from the laser to a work piece. Unfortunately, non-linear effects, such as Raman scattering and stimulating Raman scattering can limit the maximum output power and the length of the optical fibre beam delivery system, as well as impacting the ability of the laser to withstand back reflection from the work piece. The maximum length for some systems can be as small as 1 m to 2 m. This places serious limitations on the design of laser processing machines such as flat bed cutters, or the design of manufacturing shop floors, as well as on the architecture of the laser source itself. Non-linear effects are reduced with increasing core diameter, and thus optical fibres used in optical fibre beam delivery systems typically have larger core diameters than other signal fibres within the laser.

Prior art splices between dissimilar fibres either use dopant diffusion within the splice, by inserting an intermediate fibre between the two fibres being spliced, or by inserting or creating a physical taper of the outside of the fibre. Of these, the dopant diffusion is generally preferred as it can be carried out in the fusion splicer used for splicing the two fibres together. Tapering the outside of the fibre is used if the mode mismatch between the fibres is too great, or if the dopants do not diffuse reliably enough.

The use of intermediate fibres, such as graded index fibres, between the fibres in the splice is known. However this requires multiple splicing and cleaving operations, and accurate control of the length of the intermediate fibre, both of which add cost and complexity.

The degree of freedom of the dopant diffusion process is limited by the diffusion properties of the dopants. When splicing two fibres with a large difference in mode field diameter, for example greater than 50%, additional tapering of the outside of at least one of the fibres is required to obtain a low loss splice. However, even additional tapering cannot reduce losses to acceptable amounts if there is a large mismatch in numerical apertures between the fibres. Prior art dopant diffusion processes are often referred to as thermally expanded cores because diffusion is caused by heating, and the core dopants diffuse into the cladding, thus expanding the size of the core, and thus increasing the mode field area of the guided modes. Thermally expanded cores are used in splices between two optical fibres both having Gaussian shaped modes.

European Patent No. 1202090 describes an optical splice between a dispersion compensating fibre and a transmission fibre. The dispersion compensating fibre is a so-called "W-fibre" having a narrow fluorine doped ring around the core. The transmission fibre is a low-loss depressed cladding telecommunications fibre having multiple fluorophosphorus doped layers around the core. Splicing of the two fibres causes problems owing to the different diffusion rates of germania in the core and fluorine in the claddings between the two fibres. The solution is to use a bridge or intermediate fibre between the two fibres in order to form a low loss splice.

U.S. Pat. No. 6,336,749 describes a splice between a first fibre and a second fibre in which diffusion of the dopants in the second fibre causes its refractive index profile to converge optically to that of the first fibre. As a consequence of the diffusion region and its gradual longitudinal variation, the optical losses associated with the splice are relatively low, i.e. less than 0.2 dB at the operating wavelength, even when there is relatively high mismatch between the mode field diameters and mode field shapes (at a signal wavelength) in the respective fibres.

U.S. Pat. No. 5,381,503 discloses an optical waveguide comprising a core portion made of a light propagating material and a cladding portion, a first dopant and a second dopant being induced into said core portion, the first dopant having a function of increasing a refractive index of the light propagating material and having a first thermal diffusion coefficient to said light propagating material, the second dopant having a function of decreasing the refractive index of said light propagating material and having a second thermal diffusion coefficient to the light propagating material larger than the first thermal diffusion coefficient under a predetermined temperature. The patent teaches how to splice two single mode fibres together that have different mode field diameters. The patent does not teach how to design a mode field adaptor that can change the shape of the mode.

U.S. Pat. No. 6,742,939 discloses a fusion splice including a first optical fibre having a first mode field diameter and a first mode field diameter expansion rate. The splice further includes a second fibre having a second mode field diameter and a second mode field diameter expansion rate, wherein the second mode field diameter is lower than the first mode field diameter. The second fibre comprises a core, a cladding radially surrounding the core, and a zone of high concentration of fluorine between the core and the cladding. The rate of mode field diameter expansion of the first fibre is less than the rate of mode field expansion of the second fibre during the fusion splicing operation. The invention has application for splicing telecommunication single mode fibre to erbium doped fibre amplifiers.

A further limitation of dopant diffusion and tapering processes is that fibres with dissimilar mode shapes are difficult to splice together. The prior art solutions enable single mode fibres to be spliced to single mode fibres that have different mode field diameters with low loss. However, they are not suited for splicing fibres that have substantially different mode field diameters, or fibres whose refractive index profiles have substantially different shapes. For example, splicing from a Gaussian mode from a step index fibre to a doughnut mode from a ring core fibre would be difficult if not impossible with prior art techniques.

Further problems occur when splicing fibres having large mismatches in core diameter include dopants not diffusing rapidly enough. This results in sagging of the splice within the fusion splicer, and increased sensitivity to variations in the temperature profile across the fibres. Fibre sagging and increased temperature sensitivity result in unpredictable splicing processes that are unsuited to repeatable and reliable manufacturing. Such problems may be overcome in some cases with more expensive fusion splicing and ancillary equipment, but this is undesirable.

There is a need for an optical fibre that reduces or avoids the aforementioned problems.

THE INVENTION

According to the present invention there is provided an optical fibre which has a first refractive index profile that is changeable by heating to a second refractive index profile, the optical fibre comprising at least one core, a cladding, at least one first dopant for providing the first refractive index profile, at least one concealed dopant, and at least one mobile dopant, wherein:

the first refractive index profile has a first optical guidance property;
the second refractive index profile has a second optical guidance property;
the first optical guidance property is different from the second optical guidance property;
the core has a refractive index that is greater than a refractive index of the cladding;
the concealed dopant is the same as or different from the first dopant;
the mobile dopant is the same as or different from the first dopant;
the mobile dopant is different from the concealed dopant;
the mobile dopant has a diffusion constant greater than a diffusion constant of the concealed dopant; and
one of the concealed dopant and the mobile dopant has a negative molar refractivity and the other one has a positive molar refractivity;

the optical fibre being such that:
the concealed dopant is present in a concentration that, prior to heating, induces a change in the first refractive index profile;
the mobile dopant is present in a concentration that, prior to heating, induces an equal and opposite change in the first refractive index profile induced by the concealed dopant;
the first dopant is present in a concentration that has a maximum value;
the concealed dopant is present in a concentration which is more than the maximum value; and
heating of the optical fibre causes the mobile dopant to diffuse more quickly than the concealed dopant, thereby allowing the concealed dopant and the mobile dopant to change the first refractive index profile of the optical fibre to the second refractive index profile and so change the first optical guidance property to the second optical guidance property.

With the present invention, the concealed dopant is incorporated into the optical fibre at concentrations much higher than required to provide the desired first refractive index profile. In addition, the concealed dopant may be disposed in a different region of the optical fibre than the first dopant. This is a surprising departure from established thinking because incorporating the concealed dopant will change the first refractive index profile and hence change the optical guidance properties of the optical fibre. Such changes may be adverse changes such as increased bend loss, change from a single mode optical fibre to a multimode optical fibre, changes to the optical power distribution of the guided modes, and changes to the mode areas of the guided modes. It is therefore necessary to counteract or compensate for the change in the first refractive index profile by incorporating the mobile dopant to restore the refractive index profile of the optical fibre to the first refractive index profile, thus restoring the optical guidance properties of the optical fibre.

In the prior art, a mobile dopant (for example fluorine) is added in order to diffuse into the region doped with the first dopant and change the first refractive index profile of the fibre. In the present invention, the mobile dopant is added to mask the presence of the concealed dopant. It is the combination of the effects of the concealed dopant and the diffusion of the mobile dopant that enables far greater control of changes in refractive index and hence mode transformation compared to the prior art. The mode transformation can be changes in either or both mode shape and mode field diameter. This can be beneficial for the manufacturing of various optical devices as will be described below.

Incorporating dopants into glass at concentrations much higher than required to provide the desired refractive index profile is generally undesirable because glasses with higher dopant concentrations are more expensive, are more difficult to make, often have higher losses, and the higher dopant concentrations can cause devitrification of the glass which results in higher scattering losses. Moreover, increased dopant concentration can cause additional thermal stress in the glass which can lead to the optical fibre preform shattering during manufacture, and undesired fibre drawing-induced refractive index changes.

An optical fibre having the first refractive index profile will guide a mode with a first optical power distribution. After the first refractive index profile has been changed to the second refractive index profile by heating, the mode will have a second optical power distribution that is different from the first optical power distribution. The ability to control the optical power distribution along the optical fibre by controlled heating enables the fabrication of optical devices such as optical mode transformers, optical mode converters, optical mode scramblers, optical wavelength filters, long period gratings, optical signal combiners and couplers, multi-core optical fibre couplers, and output beam delivery cables.

The first optical power distribution may be the optical power distribution of the fundamental mode of the optical fibre. The first optical power distribution may be characterized by a mode field diameter and a mode shape. As will be seen in the Examples below, changes in the mode field diameter greater than 100% are obtainable without requiring tapering of the outside diameter of the optical fibre. Changes to the mode shape are also readily obtainable, including from a Gaussian to a top hat mode or doughnut mode. Advantageously, such changes can be tailored by suitable design of the heat profile along the heat affected region, allowing a single fibre to be used for a number of different modal transformations. This delivers substantial cost reduction and flexibility in components and laser design.

The first and second optical power distributions can be calculated from the first and the second refractive index profiles using Maxwell's equations, or in the limit of small refractive index variations, the Helmholtz equation. The first and the second refractive index profiles can therefore be obtained from an inverse transform of the first and second optical power distributions.

Advantageously, controlled heating of the optical fibre enables the first optical power distribution to be changed adiabatically along the optical fibre to a second optical power distribution that is more suited for splicing to a second optical fibre. The optical fibre can be spliced to the second optical fibre using a splicing process that is much quicker than obtained using prior art techniques, requiring less heat energy, and consequently less sagging. For example, in splicing from a 10 μm core diameter fibre to a 25 μm core diameter active fibre, splicing times may be able to be reduced from approximately 60 seconds using prior art thermally expanded core techniques to approximately 11 to 14 seconds using an optical fibre according to the present invention. This dramatically reduces sagging of the splice in the fusion splicer, and results in more reliable and repeatable splices suitable for high volume manufacturing. In many cases, there is no need for additional tapering or the introduction of intermediate fibres. Additional tapering or the introduction of intermediate fibres increases the complexity of the splicing process, and adds cost. In addition, complicated splicing process can be a source of unreliability.

The mobile dopant has a diffusion constant that is greater than the diffusion constant of the concealed dopant. Therefore, when the optical fibre is heated, the mobile dopant diffuses faster than the concealed dopant resulting in the change from the first refractive index profile to the second refractive index profile. Incorporation of the mobile and concealed dopants enables large changes to the first refractive index profile of the optical fibre to be obtained by heating. Heating thus reveals the presence of the mobile and concealed dopants in the optical fibre.

The first dopant may be germania and the concealed dopant may be germania.

There may be two of the first dopants. The two first dopants may be germania and ytterbium. The concealed dopant may comprise germania. The mobile dopant may be fluorine.

The concentration of the concealed dopant may be greater than the concentration of the mobile dopant.

The disposition of the concealed dopant may be in a different region of the optical fibre than the first dopant.

The cross-sectional area of the region comprising the concealed dopant may be at least two times the cross sectional area of the region comprising the first dopant. The cross-sectional area of the region comprising the concealed dopant may be at least five times the cross sectional area of the region comprising the first dopant. The cross-sectional area of the region comprising the concealed dopant may be at least ten times the cross sectional area of the region comprising the first dopant.

Incorporating the concealed dopant at such high concentrations and over such large areas enables much greater design flexibility in obtaining the desired change in the optical guidance property of the optical fibre. This efficiency can be quantified by a figure of merit defined as the root mean square of the change in the first refractive index profile caused by heating, divided by the maximum concentration of the mobile dopant, multiplied by the ratio of the maximum to the minimum of the mode field diameter before heating and the mode field diameter after heating, averaged over a cross-sectional area having a diameter that is twice the maximum of the mode field diameter before heating and the mode field diameter after heating. The figure of merit may be at least 50. The figure of merit may be at least 100. The figure of merit may be at least 200.

The optical fibre may have a fundamental mode defined by an $M^2$ value prior to heating less than 1.15, and a fundamental mode defined by an $M^2$ value after heating that is at least 1.2. The $M^2$ value after heating may be at least 1.3. The $M^2$ value after heating may be at least 1.5. The $M^2$ value is a measure of the beam quality, an $M^2$ value of 1.0 corresponding to a Guassian beam. The $M^2$ value is a measure of the shape of the fundamental mode, the higher the $M^2$ value, the less Gaussian the mode. In order to achieve low splice losses of the fundamental modes guided by two optical fibres, it is necessary to match the size and shape of the fundamental modes. The ability to provide such large changes in the $M^2$ value by heating is an advantage of the present invention.

The optical fibre may be a single mode optical fibre prior to heating, and a multimode optical fibre after heating.

The optical fibre may be a multimode optical fibre prior to heating, and more multimoded after heating.

The disposition and concentration of the concealed and mobile dopants may be such that heating of the optical fibre results in the fundamental mode having a top hat optical power distribution.

The disposition and concentration of the concealed and mobile dopants may be such that heating of the optical fibre results in the fundamental mode having a doughnut optical power distribution.

The magnitude of a product of the concentration of the concealed dopant and the molar refractivity of the concealed dopant may be greater than the difference between the refractive index of the core and the refractive index of a region surrounding the core.

The magnitude of a refractive index change induced by incorporating the mobile dopant into the optical fibre may be greater than the difference between the refractive index of the core and the refractive index of a region surrounding the core.

Incorporating the mobile dopant at concentrations that induce changes in the refractive index of the optical fibre that are greater than induced by the first dopant is a radical departure from the prior art. If it were not for the concealed dopant, the first refractive index profile would be changed substantially. By balancing the refractive index change induced by the mobile dopant with the concealed dopant, the presence of the mobile dopant is masked until the optical fibre is heated. For example, if the first and the concealed dopants are germania, and the mobile dopant is fluorine, then the refractive index of the core can be made to change more quickly if the concentration of the first dopant is less than the concentration of the concealed dopant than if the concentration of the first dopant is more than the concentration of the concealed dopant. This enables splices to be made more quickly than if the concentration of the first dopant were equal to or greater than the concentration of the concealed dopant, leading to more reliable splices. Advantageously, it also allows much larger and more flexible modal transformations, including changes in the shape of the fundamental and other guided modes, than obtainable by prior art methods.

The core may support a fundamental mode having a mode field diameter. The mode field diameter after heating may be greater than the mode field diameter prior to heating. The mode field diameter after heating may be at least 1.5 times greater than the mode field diameter prior to heating. The mode field diameter after heating may be at least 2.0 times greater than the mode field diameter prior to heating.

The concealed and mobile dopants may have a disposition and a concentration such that the diffusion of the mobile dopant increases an effective mode area of a fundamental mode guided by the optical fibre.

Designing the optical fibre such that heating causes at least one of the mode field diameter and the effective mode area to increase enables the optical fibre to be spliced to a fibre that is more multimoded than the optical fibre.

The concentration and disposition of the concealed and mobile dopants may be such that heating of the optical fibre causes a reduction in a refractive index of the core. Further heating may cause the refractive index of the core to become equal to the refractive index of a region surrounding the core. Designing the optical fibre such that if heated the refractive index of the core becomes equal to the refractive index of the region surrounding the core, enables splices to be made to fibres having a core diameter that is larger than the core diameter of the optical fibre prior to heating. If the optical fibre has a substantially step index core, then the optical fibre after reheating will also have a substantially step index core, but one with a smaller refractive index, and larger core diameter. This enables fibres with different core sizes to be spliced together without necessitating tapering the outside of one or both of the fibres, or using tapers that are spliced between the two fibres.

Further heating may cause the refractive index of the core to become less than the refractive index of the region surrounding the core. This has the advantage that the shape of the fundamental mode can be changed from Gaussian to doughnut, and low loss splice with a second optical fibre with doughnut shaped core is possible.

The concentration and disposition of the concealed and mobile dopants may be such that the diffusion of the mobile dopant causes an increase in the refractive index of the core.

The concealed and mobile dopants may have a disposition and a concentration such that the diffusion of the mobile dopant decreases a mode field diameter of a fundamental mode guided by the optical fibre.

The modal behaviour of an optical fibre is defined at its operating wavelength. The operating wavelength may be in a visible or near infrared wavelength range. The wavelength range may be 1000 nm to 1100 nm, 1300 nm to 1350 nm, 1500 nm to 1600 nm, or 1.900 nm to 2500 nm. Ytterbium doped fibre lasers operate in the wavelength range 1000 nm to 1100 nm. A step index optical fibre that has a normalized frequency less than 2.405 is a single mode fibre. A step index fibre with a normalized frequency of at least 2.405, and preferably greater than 4, is a multimode fibre. Coupling from a singlemode fibre laser into a multimode fibre with low loss and high modal purity, allows single mode propagation through the multimode fibre, thereby avoiding the effects of stimulated Raman scattering and other non-linear optical effects. This is especially important for power levels greater than 1 kW, 2 kW, or 10 kW, and more important for pulsed lasers having peak powers greater than 10 kW. The advantages increase as the length of the multimode fibre increase because the onset of non-linear optical behaviour is power and length dependent.

The optical fibre may include a pedestal surrounding the core. A pedestal is a cladding that has a refractive index larger than the refractive index of an outer cladding, but less than the refractive index of the core. In general, the core can waveguide against the pedestal. Pedestals have the advantage of reducing failures in pulsed lasers arising from power leaking from the core of active fibres because power that leaks from the core into the pedestal can be guided by the pedestal and routed away from pump diodes. Pedestals are also used in the design of certain non-photodarkening fibres.

The first dopant may be different from the mobile dopant and the concealed dopant.

The first dopant may be the same as one of the mobile dopant and the concealed dopant.

At least one of the mobile dopant and the concealed dopant may be disposed in at least six longitudinally extending regions having a diameter less than 5 μm. Such a fibre is known as a microstructured fibre, and the longitudinally extending regions are known as microstructures. The microstructures may comprise longitudinally extended structures comprising the concealed dopant, and longitudinally extended structures comprising the mobile dopant. The refractive index is the average refractive index of these longitudinally extended structures over the cross sectional area of the region in which they are contained.

The first dopant may comprise at least one of germanium, phosphorus, and aluminium.

The first dopant may comprise at least one lanthanide. The first dopant may comprise phosphorus and aluminium. The first dopant may comprise phosphorus and aluminium in equal concentrations to each other in the core. The concentration of the phosphorus may be at least approximately equal to the concentration of the aluminium. The concentration of the phosphorus may be at least twice the concentration of the aluminium. Advantageously, such dopant concentrations are known to reduce photodarkening. The concealed dopant may comprise phosphorus.

The concentration of the mobile dopant may be at least 0.3 mol %. The concentration of the mobile dopant may be at least 0.5 mol %. The concentration of the mobile dopant may be at least 0.8 mol %.

The mobile dopant may comprise fluorine.

The concealed dopant may comprise at least one of germanium, phosphorus, and aluminium.

The core may have a core diameter of at least 10 μm. The core diameter may be at least 20 μm.

The optical fibre may be made from an oxide glass system. The oxide glass system may be selected from the group silica, doped silica, silicate and phosphate. Examples of dopants that raise the refractive index of silica include oxides of germanium, aluminium, chlorine, tantalum, titanium, tin, cerium, praseodymium, neodymium, promethium, samarium, europium, gadolinium, terbium, dysprosium, holmium, erbium, thulium, and ytterbium. Examples of dopants that depress the refractive index of silica include fluorine, and oxides of boron.

The optical fibre may comprise a plurality of cores.

The invention also provides an optical fibre device comprising a splice between the optical fibre of the invention and a second optical fibre, wherein the splice has a loss less than 0.5 dB. The second optical fibre may be an optical fibre of the invention. The second optical fibre may be a microstructured optical fibre. The second optical fibre may be a photonic bandgap fibre, a Kagome fibre, or a hollow core anti-resonant optical fibre. Such optical fibres have very low optical non-linearities compared with solid core optical fibres and are important for laser beam delivery. Such optical fibres also have important applications in telecommunications, and the invention enables splicing of microstructured optical fibres to devices such as optical filters and optical amplifiers.

The optical fibre and the second optical fibre may have a mismatch in core diameters of at least 5 μm. The mismatch may be at least 10 μm.

The optical fibre may support a fundamental mode having a first mode field diameter before heating, and a second mode field diameter after being heated. Preferably, the second mode field diameter is the same as the mode field diameter of the second optical fibre, thus enabling a low loss fusion splice to be made between the optical fibre and the second optical fibre. Arranging for the core diameters and refractive indices to be equal at the splice enables low loss, high mode purity splices to be made. The optical fibre and the second optical fibre may have different refractive index profiles. However if the mode field diameters are equal, then the splice losses should be minimized. This is particularly advantageous for splicing single mode or low-moded optical fibres into the multimode optical fibres that are used in high-power laser optical-fibre beam delivery systems. Importantly, the fundamental mode of the single mode fibre may be coupled to the fundamental mode of the multimode optical fibre with low loss (for example less than 0.1 dB), and low conversion to higher order modes.

The second refractive index profile may be azimuthally asymmetric. This is advantageous for coupling from a single mode or multimode optical fibre that is configured to propagate a fundamental mode to a second optical fibre that is multimode. Arranging for the second refractive index profile to be asymmetric allows reliable coupling to low order modes of the multimode second optical fibre.

The optical fibre device may be one in which the optical fibre is tapered.

The invention also provides an optical fibre device comprising a plurality of the optical fibres of the invention, wherein the optical fibres are arranged side by side and are fused together, the optical fibre device being in the form of a signal combiner.

The invention also provides an optical fibre device comprising at least one of the optical fibres of the invention and at least one second fibre, wherein the optical fibre and the second fibre are arranged side by side and are fused together, the optical fibre device being in the form of a signal feed-through combiner.

The invention also provides an optical fibre device comprising at least one of the optical fibres of the invention, wherein the optical fibre comprises a plurality of regions having the second refractive index profile, the regions have a length in the range 100 μm to 1 mm, the regions having a separation in the range 100 μm to 5 mm, the optical fibre device being in the form of an optical filter. The regions may be azimuthally asymmetric.

The invention also provides an optical fibre device comprising at least one of the optical fibres of the invention, wherein the optical fibre has an angled facet, and the core diameter increases towards the angled facet.

The invention also provides an optical fibre device comprising at least one of the optical fibres of the invention.

The optical fibre device may comprise at least one second fibre comprising a core, and wherein the core comprises at least one lanthanide. The lanthanide may be ytterbium. Alternatively or additionally, the lanthanide may be cerium. Lanthanides, which are typically introduced into fibres as rare earths, form the basis of optical amplifiers, lasers, and other active optical devices.

The core of the second optical fibre may comprise aluminium and phosphorus, and the concentration of the phosphorus may be at least equal to the concentration of the aluminium. The concentration of the phosphorus may be at least twice the concentration of the aluminium. Such fibres are known to be low photodarkening.

The concentration of the aluminium may be at least ten times the concentration of the lanthanide.

The optical device may include at least one reflector, the optical fibre device being in the form of a laser.

The optical device may include a seed laser, the optical fibre device being in the form of a master oscillator power amplifier.

The optical fibre device may include a pump, wherein the pump is configured to pump the lanthanide.

The optical fibre device may be defined by an output power greater than 1 kW. The output power may be greater than 2 kW.

The optical fibre device may be defined by a peak power greater than 10 kW. The optical fibre device may be defined by a peak power greater than 100 kW. Such optical fibre devices have important applications in picosecond (ps) lasers.

The optical fibre device may include a beam delivery cable wherein the beam delivery cable has a length greater than 5 m. The beam delivery cable may have a length greater than 10 m. The beam delivery cable may include the optical fibre of the invention. The optical fibre may be defined by an output end from which laser radiation can be emitted, and wherein the optical fibre has been thermally treated at the output end in order to change at least one optical guidance property of the optical fibre. The optical guidance property may be an increase in the mode field diameter of the fundamental mode. The optical guidance property may be shape of the fundamental mode. Thus for example, an increase in effective core diameter reduces the power density at the end of the fibre, and thus increases the power handling of the fibre. Alternatively the optical fibre may be thermally treated at the output end in order to decrease an effective core diameter. Decreasing the effective core diameter can increase the divergence of the optical radiation that is emitted from the optical fibre, and reduce the power density on focussing optics. The fibre can be joined to an end cap made of silica in order to increase the power handling further. The output end may be angle cleaved in order to reduce reflections back into the optical fibre device.

The optical fibre can be thermally treated at the output end in order to change the optical power distribution. This allows optimisation of the properties of the beam at the output of the fibre in accordance with specific process requirements, for example spot size and/or doughnut beam shape for improved cutting/welding. The fibre inside the beam delivery cable can be optimised independently from the output beam requirements, improving flexibility and functionality of the laser. As an example, the fibre can have a large core diameter to reduce nonlinearities in the delivery cable, but the core can be made smaller at the output end via thermal treatment to increase the divergence of the emitted light and reduce the power spectral density at the processing optics, with reduced risk of thermal lensing and optical aberrations.

The invention also provides a method for changing a first refractive Index profile in an optical fibre to a second refractive index profile, wherein the optical fibre comprises at least one core, a cladding, at least one first dopant for providing the first refractive index profile, at least one concealed dopant, and at least one mobile dopant, and the optical fibre being characterized in that:

the first refractive index profile has a first optical guidance property;
the second refractive index profile has a second optical guidance property;
the first optical guidance property is different from the second optical guidance property;
the core has a refractive Index that is greater than a refractive index of the cladding;
the concealed dopant is the same as or different from the first dopant;
the mobile dopant is the same as or different from the first dopant;
the mobile dopant is different from the concealed dopant;
the mobile dopant has a diffusion constant greater than a diffusion constant of the concealed dopant;
one of the concealed dopant and the mobile dopant has a negative molar refractivity and the other one has a positive molar refractivity;
the concealed dopant is present in a concentration that, prior to heating, induces a change in the first refractive index profile;
the mobile dopant is present in a concentration that, prior to heating, induces an equal and opposite change in the first refractive index profile induced by the concealed dopant;
the first dopant is present in a concentration that has a maximum value; and
the concealed dopant is present in a concentration which is more than the maximum value,
the method comprising the steps of:
providing the optical fibre;
heating the optical fibre to cause the mobile dopant to diffuse more quickly than the concealed dopant; and
allowing the concealed dopant and the mobile dopant to change the first refractive index profile of the optical fibre to the second refractive index profile and so change the first optical guidance property to the second optical guidance property,
The mobile dopant may be different from the first dopant.

BRIEF DESCRIPTION OF THE DRAWINGS

Embodiments of the invention will now be described solely by way of example and with reference to the accompanying drawings wherein.

DETAILED DESCRIPTION OF PREFERRED EMBODIMENTS OF THE INVENTION

Figure 1:
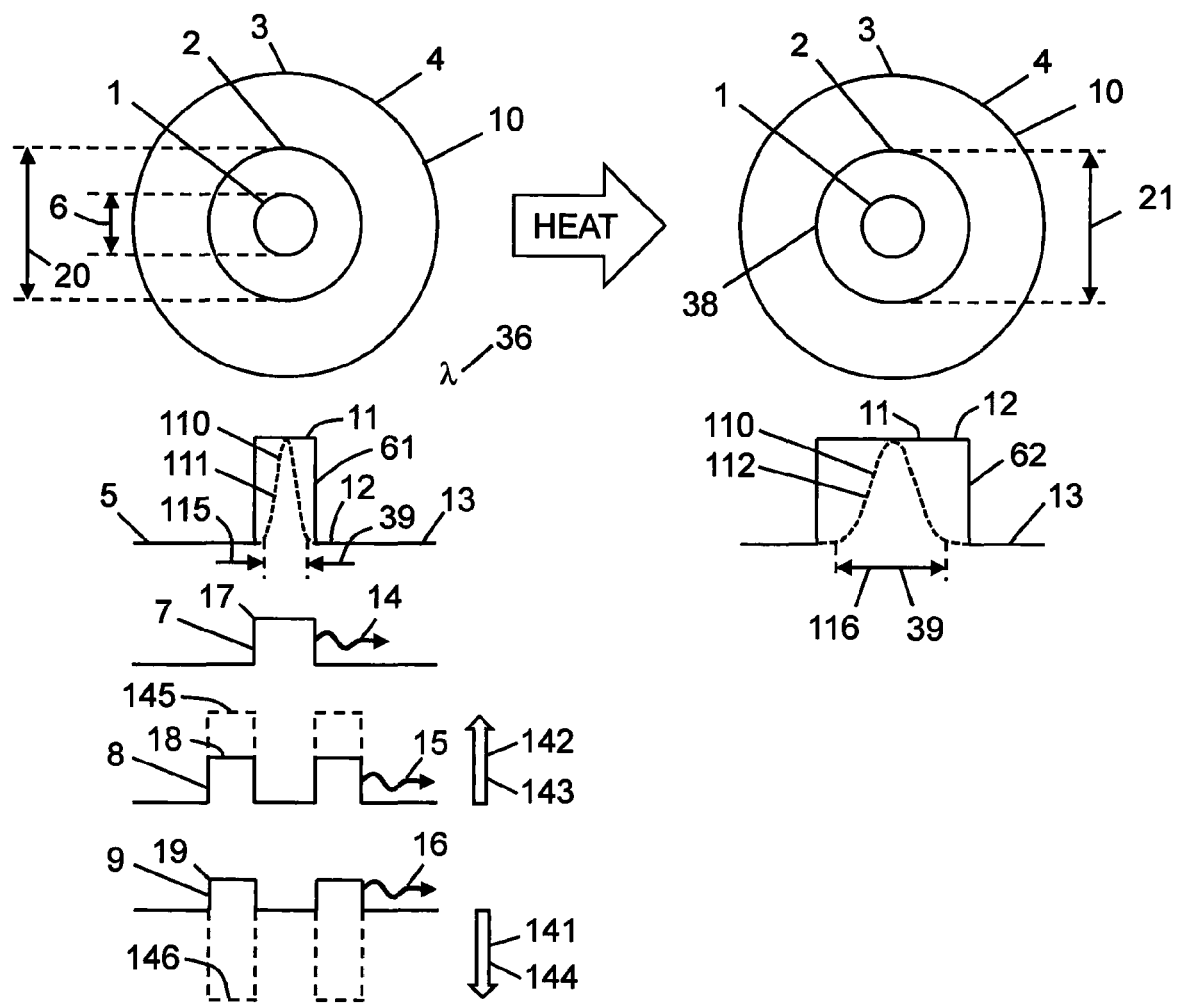
FIG. 1 shows an optical fibre according to the present invention, which optical fibre has a first refractive index profile that can be changed by heating to a second refractive index profile and so change an optical guidance property of the optical fibre such that the optical fibre can be used in different optical devices having different requirements.

FIG. 1 shows an optical fibre 10 which has a first refractive index profile 61 that can be changed by heating to a second refractive index profile 62, the optical fibre 10 comprising at least one core 1, a cladding 3, at least one first dopant 7 for providing the first refractive index profile 61, at least one concealed dopant 8, and at least one mobile dopant 9, the core 1 having a refractive index 11 that is greater than a refractive index 13 of the cladding 3, and the core 1 having a first core diameter 6, the optical fibre 10 being characterized in that:

one of the concealed dopant 8 and the mobile dopant 9 has a negative molar refractivity 141 and the other one has a positive molar refractivity 142;

the mobile dopant 9 is present in a concentration 19 to balance a change 146 in the first refractive index profile 61 induced by the concealed dopant 9;

the concealed dopant 8 is present in a concentration 18 that if not balanced by the mobile dopant 9 would change the first refractive index profile 61;

the mobile dopant 9 has a diffusion constant 16 greater than a diffusion constant 15 of the concealed dopant 8 so that heating of the optical fibre 10 causes the mobile dopant 9 to diffuse more quickly than the concealed dopant 8, thereby allowing the concealed dopant 8 and the mobile dopant 9 to change the first refractive index profile 61 of the optical fibre 10 to the second refractive index profile 62 and so change an optical guidance property 39 of the optical fibre 10 such that the optical fibre 10 can be used in different optical devices having different requirements.

The guidance property 39 of the optical fibre 10 is dependent on the optical wavelength 36, and is shown as the mode field diameter 115 of the optical mode 110, which increases after heating to the mode field diameter 116. Alternatively or additionally, the optical guidance property 39 may be the optical power distribution 111 of the mode 110 which has changed to the optical power distribution 112. The optical mode 110 may be the fundamental mode that is guided by the fibre 10.

In FIG. 1, the mobile dopant 9 and the concealed dopant 8 are shown disposed in a doped region 2 surrounding the core 1. If the concealed dopant 8 were not present, the mobile dopant 9 would induce a refractive index change 146 to the first refractive index profile 61. Theoretically, the refractive index change 146 is equal to the product of the mobile dopant concentration 19 and the molar refractivity 144. The refractive index change 146 is balanced by the concealed dopant 8, which induces an equal and opposite refractive index change 145. Theoretically, the refractive index change 145 is equal to the product of the concealed dopant concentration 18 and the balancing molar refractivity 143. The net effect is to leave the first refractive index profile 61 induced by the first dopant 7 that is present in a first concentration 17 substantially unchanged. In this example, the refractive index 12 of the doped region 2 is equal to the refractive index 13 of the cladding 3.

The refractive index change 145 is shown equal to the difference between the refractive index 11 of the core 1 and the refractive index 13 of the cladding 3. If the diffusion coefficient 16 of the mobile dopant 9 is much greater than the diffusion coefficient 15 of the concealed dopant 8 and the diffusion coefficient 14 of the first dopant 7, then if the fibre 10 is heated to a high enough temperature, the mobile dopant 9 will diffuse completely through the fibre 10 revealing the presence of the refractive index change 145 induced by the concealed dopant 8. The result is the creation of a core 38 comprising the core 1 and the doped region 2. The core 38 has a diameter 21 that is substantially equal to the diameter 20 of the doped region 2 prior to heating. The core diameter 21 can be 10% to at least 1000% times larger than the first core diameter 6. The optical fibre 10 enables fibres with substantially different core sizes to be spliced together without necessitating tapering the outside of one or both of the fibres, or using tapers that are spliced between the two fibres.

Figure 2:
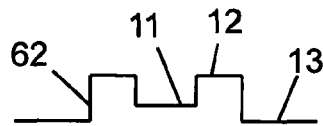
FIG. 2 shows the refractive index of an optical fibre after being heated wherein the refractive index of the core is less than that of the region surrounding the core.

Referring to FIG. 1, if the balancing and mobile dopant concentrations 18, 19 are increased, then after heating, the refractive index 12 of the doped region 2 will be higher than the refractive index 11 of the core 1, resulting in the second refractive index profile 62 shown in FIG. 2.

In practice, the heating is generally stopped before the mobile dopant 9 has diffused throughout the fibre 10. There will also be some diffusion of the concealed dopant 8 and the first dopant 7. Different second refractive index profiles 62 are therefore achievable corresponding to how much diffusion has been allowed to occur. A particular second refractive index profile 62 can be selected by determining the temperature and time that heat energy is applied to the fibre 10, or more typically, to different parts of the fibre 10. For example, optical fibre fusion splicers can generally be programmed to deliver different temperatures over different times and in different regions along the core 1 and across the core 1 and the cladding 3. Optical fibre fusion splicers use flames, electric arcs, or lasers such as carbon dioxide lasers to apply heat to the fibre.

In the Examples, it will be shown how diffusion of the mobile dopant 9 from the doped region 2 can increase in the refractive index 12 of the doped region 2, thereby revealing the presence of the concealed dopant 8. In addition, the mobile dopant 9 can diffuse into the core 1, thereby reducing its refractive index 11. Designing the optical fibre 10 such that the refractive index 11 of the core 1 can become less than the refractive index 12 of the doped region 2 has the advantage that the time taken during the heating process for the refractive indices 11, 12 to become equal to each other is shortened. Shorter process times result in more reliable splices that can be made more predictably, without undesirable sagging or weaknesses introduced during the splicing process.

The presence and the design of the disposition and concentration of the concealed dopant 8 make the present invention different and more flexible than prior art solutions. In the prior art, refractive index changes are achieved by diffusing the fluorine, a mobile dopant, into regions where much lower concentration of the fluorine is present. Large refractive index changes are only achievable by using very large concentrations of fluorine, such as 4 mol %. In the present invention, similar or larger changes in the refractive index and in the optical power distribution can be obtained using significantly lower concentrations of the mobile dopant 9 and by designing the disposition and concentration of the concealed dopant 8 in order to increase the refractive index as the mobile dopant diffuses upon heating. The present invention combines the effects of the refractive index changes 145 and 146 of the concealed and mobile dopants 8, 9, respectively. This simplifies the fabrication of the optical fibre preform due to the lower concentrations of mobile dopant required. It also allows better control of the disposition of the mobile dopant during the fabrication of the optical fibre and prior to the fibre being heated. Improved control of the rate of change of the refractive index profile is also achieved, improving the process reliability and reproducibility of components manufactured according to the present invention.

In order to quantify how effectively a given concentration of mobile dopant 9 may be used to change the first refractive index profile 62 and the guidance property 39 of the optical fibre 10 by heating, a figure of merit (FoM) has been developed. The FoM is the root mean square of the change in the first refractive index profile 61 caused by heating, divided by the maximum concentration of the mobile dopant 9, and multiplied by the ratio of the maximum to the minimum of the mode field diameter 115 before heating and the mode field diameter after heating 116. The averaging for the root mean square is performed over a cross-sectional area (not shown) having a diameter that is twice the maximum of the mode field diameters 115 and 116. The FoM is given by the following formula:

$$FoM = \frac{\int_0^{2\pi} \int_0^{2*MFD_{max}} \sqrt{(n1-n2)^2} \cdot r \cdot dr \cdot d\theta}{\int_0^{2\pi} \int_0^{2*MFD_{max}} r \cdot dr \cdot d\theta} \cdot \frac{1}{C_{SiO_{1.5}F}} \cdot \frac{MFD_{max}}{MFD_{min}} \quad (1)$$

where n1 and n2 are the first and second refractive indices 61 and 62 of the optical fibre 10 before and after heating, $MFD_{max}$ and $MFD_{min}$ are the largest and smallest of the mode field diameter 115 prior to heating and the mode field diameter 116 after heating, and $C_{SiO_{1.5}F}$ is the maximum of the concentration 19 of the mobile dopant 9 (in mol %) in the optical fibre 10 prior to heating. The FoM will be calculated and discussed in the Examples.

Table 1 shows the molar refractivities for dopants commonly used in optical fibre manufacturing using silica glass. The molar refractivities are shown as the change in refractive index per mole percent of dopant (Δn/mol %). Thus 1 mol % of germania raises the refractive index of silica by 0.0015. Oxides of germanium, phosphorus, aluminium, and lanthanides such as cerium and ytterbium raise the refractive index of silica. Boron trioxide and fluorine depress (lower) the refractive index of silica. The molar refractivities shown assume the dopant is incorporated into pure silica. If other dopants are already incorporated into the silica glass, then the molar refractivity can alter. For example, aluminium phosphate depresses the refractive index of silica when the ratio of the concentrations of the aluminium ion to the phosphorus ion is one to one. In addition, there is some variation in molar refractivity values quoted in the literature. It is therefore desirable to verify experimentally the concentration 18 of the concealed dopant 8 that is required to balance the refractive index change 146 induced by the mobile dopant 9.

TABLE 1

Typical Molar Refractivities of Dopants in Silica Glass

| Dopant | Component | Molar Refractivity in Silica ($SiO_2$) Δn/mol % | Notes |
| --- | --- | --- | --- |
| Germania | $GeO_2$ | +0.0015 | |
| Phosphorus Pentoxide | $P_2O_5$ | +0.0010 | |
| Alumina | $Al_2O_3$ | +0.0023 | |
| Cerium Oxide | $CeO_2$ | +0.0054 | |
| Ytterbium Trioxide | $Yb_2O_3$ | +0.0054 | |
| Alumina Phosphate | $AlPO_4$ | −0.000084 | [Al]:[P] concentration is 1:1 |
| Fluorine | $SiO_{1.5}F$ | −0.00525 | |
| Boric Trioxide | $B_2O_3$ | −0.0005 | |
| Chlorine | $SiO_{1.5}Cl$ | +0.0002 | |

Optical fibres can be manufactured by depositing layers of glass and dopants along the inside of a glass capillary, and then collapsing the glass capillary to form a solid optical fibre preform. The optical fibre is then drawn from the optical fibre preform and a plastic coating added during the fibre drawing process. Dopant diffusion and evaporation can occur during deposition and collapse of the capillary resulting in ripples and other variations in refractive indices across the fibre cross section. The refractive indices referred to herein are meant to mean the average refractive index over certain named cross-sections. Thus for example, the refractive index 11 in FIG. 1 is meant to mean the average refractive index over the cross sectional area of the core 1. Similarly, the refractive index 12 is meant to mean the average refractive index over the cross sectional area of the doped region 2.

Referring to FIG. 1, the cladding 3 is made from a glass 4 having a refractive index 5. At least the outside region of the cladding 3 is usually made from silica glass or synthetic silica glass. Synthetic silica capillaries typically comprise chlorine and thus have a higher refractive index 5 than pure silica capillaries. Dopants are often added to the deposited glass layers within synthetic silica capillaries to compensate for this higher refractive index. As will be shown in the Examples, the first dopant 7 that provides the first refractive index profile 61 in FIG. 1 would therefore include the chlorine dopant and any dopants added to compensate for the chlorine if a synthetic silica capillary is used in the manufacture of the optical fibre 10.

Figure 3:
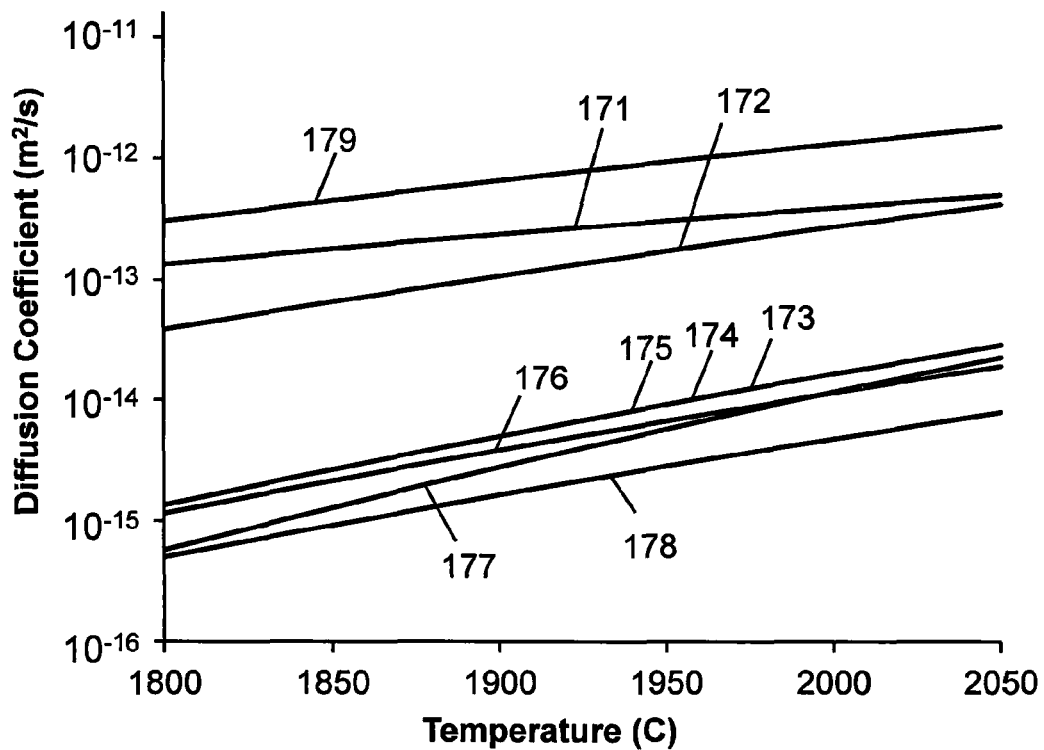
FIG. 3 shows the temperature variation of the diffusion coefficients of typical dopants used in optical fibre manufacture.

FIG. 3 shows the diffusion coefficients of chlorine 171, fluorine 172, and oxides of aluminium, 173, ytterbium 174, cerium 175, boron 176, germanium 177, and phosphorus 178 in silica. The diffusion coefficients of oxides of aluminium, ytterbium, and cerium are believed to be the same. The diffusion coefficients have been plotted assuming a 1 mol % dopant concentration for each of the dopants in pure silica. The diffusion coefficients for aluminium, 173, ytterbium 174, cerium 175, boron 176, germanium 177, and phosphorus 178 increase with increasing dopant concentration. The diffusion coefficients above relate to diffusion of ions through binary silica glass systems, that is systems comprising silica and the dopant. Diffusion through softer glasses, such as silica doped with phosphorus pentoxide, is faster than diffusion through silica, as shown by the diffusion coefficient 179 of fluorine in silica glass doped with phosphorus pentoxide. It can therefore be advantageous to add phosphorus pentoxide to the core 1 and the doped region 2 of the optical fibre 10 in order to reduce the time needed for the diffusion to take place.

Figure 4:
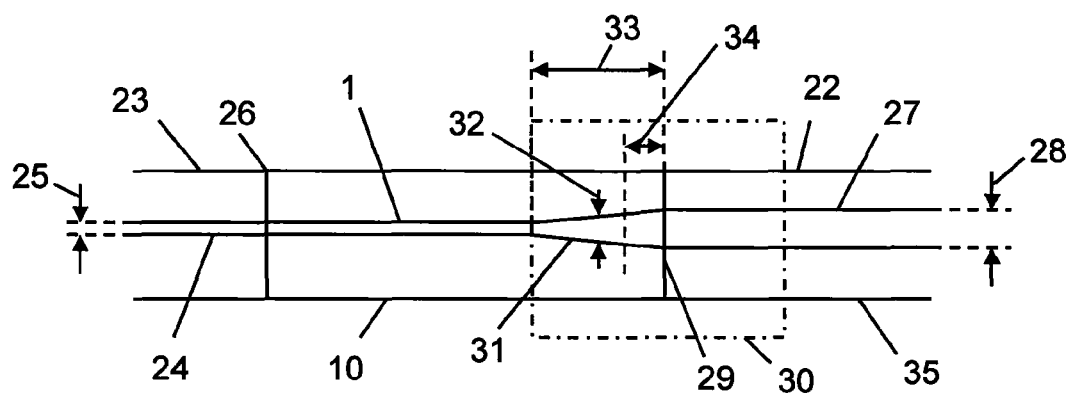
FIG. 4 shows a splice according to the present invention between an optical fibre and a second optical fibre.

As shown with reference to FIG. 4, the optical fibre 10 enables a splice 29 to be made to a second optical fibre 22 having a core 27 with a core diameter 28 that is larger than the first core diameter 6. FIG. 4 shows the optical fibre 10 spliced to a second optical fibre 22 and to a third optical fibre 23. The third optical fibre 23 has a core 24 with a core diameter 25 that is equal to the first core diameter 6 of the optical fibre 10. The optical fibre 10 and the third optical fibre 23 can be fusion spliced together to form the splice 26 using an optical fibre fusion splicer. Low loss (less than 0.15 dB) splices are readily achievable.

The second optical fibre 22 has a cladding 35 surrounding the core 27. The core 27 has a core diameter 28 that is larger than the first core diameter 6 of the optical fibre 10. It is therefore necessary to allow the mobile dopant 9 to diffuse into the core 1 of the optical fibre 10 and reveal the presence of the concealed dopant 8 in order to expand the core 1 of the optical fibre 10 such that its effective core diameter 32 matches the core diameter 28 at the fusion splice 29.

A fusion splicer can be positioned such that it provides an arc, a flame, or a laser beam over a splicing region 30, with the highest temperature within the arc, flame or laser beam at the fusion splice 29. The temperature falls either side of the fusion splice 29. The diffusion rate of the mobile dopant 9 decreases with falling temperature, thus decreasing the amount of diffusion of the mobile dopant 9 that occurs either side of the fusion splice 29. This variation in diffusion results in a taper 31 of the effective core diameter 32 of the optical fibre 10. The variation in diffusion can also be achieved by moving the fibre 10 and the second optical fibre 22 with respect to the position of the arc, flame or laser beam and changing either the temperature or the time the arc flame or laser beam remains at each position within the taper region 31. The length 33 of the taper 31 is determined by the design of the fusion splicer and in particular in how much relative movement can be achieved with the fibre 10, but is typically in the range 1 mm to 5 mm. The length 33 can be longer than 5 mm or shorter than 1 mm. The effective core diameter 32 is preferably equal to the core diameter 28 of the second optical fibre 22 at the splice 29. Properties of the taper 31 at distances 34 from the splice 29 will be discussed with reference to the Examples.

The first dopant 7 may be the same as the concealed dopant 8. For example, both the first dopant 7 and the concealed dopant 8 may comprise germania.

The concentration 17 of the first dopant 7 in the core 1 may be less than the concentration 18 of the concealed dopant 8. For example, if the first and the concealed dopants 7, 8 are germania, and the mobile dopant 9 is fluorine, then the refractive index 11 of the core 1 will reduce more quickly than if the concentration 17 were less than the concentration 18. This enables splices to be made more quickly than if the concentration 17 of the first dopant 7 in the core 1 were equal to or greater than the concentration 18 of the concealed dopant 8. It has been found that splices that can be made more quickly are more reliable.

Example 1

Figure 5:
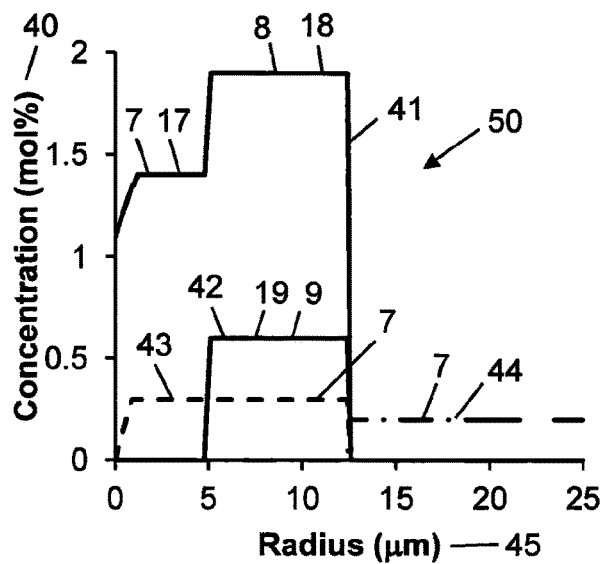
FIGS. 5 to 11 show how, in a design of an optical fibre according to the present invention, the mode field diameter increases with heating, and compares this to an optical fibre not according to the invention that has the same refractive index profile.

FIG. 5 shows dopant concentration 40 in mole percent versus radius 45 in microns for an optical fibre 50. The optical fibre 50 is an example of the optical fibre 10 of FIG. 1. The first dopant 7 and the concealed dopant 8 both comprise germania. The first dopant 7 also includes phosphorus and chlorine. The germania concentration 41 had the first dopant concentration 17 in the core 1, and the concealed dopant concentration 18 in the doped area 2, which concealed dopant concentration 18 was larger than the first dopant concentration 17. The cross-sectional area containing the concealed dopant 8 is more than five times the cross sectional area of the core 1. Similar designs have cross sectional areas containing the concealed dopant 8 that is at least two times greater than the cross sectional area of the core 1, and can be as large as ten times greater. The mobile dopant 9 was fluorine. The fluorine concentration 42 had a mobile dopant concentration 19 in the doped area 2. The cladding 3 is made from a synthetic silica glass substrate tube into which the glass layers of the core 1 and doped region 2 were deposited during fibre manufacture. The glass 4 was silica glass having a chlorine concentration 44 in the cladding 3. The optical fibre 50 was also doped with phosphorus pentoxide which had a phosphorus pentoxide concentration 43 in the core 1 and the doped area 2. The phosphorus pentoxide was added in order to increase the diffusion rates of the mobile dopant 9, and to raise the refractive index of the glass layers that were deposited during manufacture in order to compensate for the chlorine dopant.

The germania concentration 41 and the phosphorus pentoxide concentration 43 showed a dip at a radius 45 equal to zero, corresponding to the centre of the optical fibre 50. This dip is characteristic of optical fibres made from modified chemical vapour deposition (MCVD), and is caused by germania and phosphorus pentoxide evaporating during the high temperature (2000 C) collapse of the capillary from which the optical fibre preform is made. Other optical fibre manufacturing processes, such as outside vapour deposition (OVD) and vapour-phase axial deposition (VAD) do not typically result in such dips in the dopant concentrations.

The concentrations of the dopants are shown in Table 2, together with the chemical formula of the functional unit. For example, the concentration of fluorine is measured as the mole percentage of $SiO_{1.5}F$. The calculated first refractive index profile 61, shown by the dashed line in FIG. 9, was obtained from the molar refractivities in Table 1 and the concentrations in Table 2.

Figure 6:
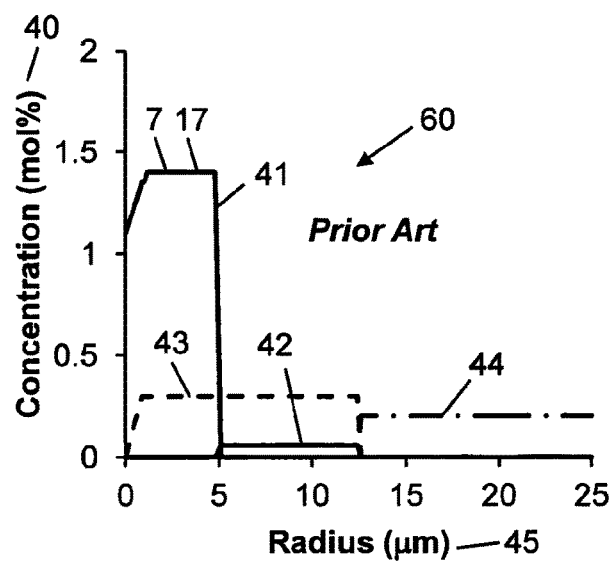

The concentrations are compared in the table with an equivalent fibre 60, shown with reference to FIG. 6, that has the same first refractive index profile 61, but without the additional mobile dopant 9 and concealed dopant 8. The germania concentration 41, the phosphorus pentoxide concentration 43 and the chlorine concentration 44 are the same in the core 1 and the cladding 3 as for the optical fibre 50 described with reference to FIG. 5. The germania concentration 41 in the doped region 2 has been reduced to 0 mol %. The fluorine concentration 42 is 0.057 mol %, representing a reduction by a factor of 10.5 from the 0.6 mol % fluorine of the optical fibre 50. The core delta Δ 147 is an important guidance parameter in optical fibres, and is the difference in the refractive index 11 of the core 1 and the refractive index 13 of the cladding 3. The core delta Δ 147 is approximately 0.002.

Referring again to the optical fibre 50 of FIG. 5, the germania concentration 41 is 1.9 mol % in the doped region 2, which is higher than the 1.4 mol % germania concentration 41 in the core 1. The fluorine concentration 42 of 0.6 mol % is substantially higher than the 0.057 mol % of the optical fibre 60 that has the same first refractive index profile 61 as the optical fibre 50.

TABLE 2

Dopant Concentrations

| Location | Dopant | Chemical Formula | Concentration in fibre 50 of FIG. 5 | Concentration in fibre 60 of FIG. 6 | Difference in Concentration |
|---|---|---|---|---|---|
| 0 to 5 μm | Germania | $GeO_2$ | 1.4 mol % | 1.4 mol % | |
| 0 to 5 μm | Phosphorus Pentoxide | $P_2O_5$ | 0.25 mol % | 0.25 mol % | |
| 5 to 12.5 μm | Germania | $GeO_2$ | 1.9 mol % | 0 mol % | 1.9 mol % |
| 5 to 12.5 μm | Fluorine | $SiO_{1.5}F$ | 0.6 mol % | 0.057 mol % | 0.543 mol % |
| 5 to 12.5 μm | Phosphorus Pentoxide | $P_2O_5$ | 0.3 mol % | 0.3 mol % | |
| >12.5 μm | Chlorine | $SiO_{1.5}Cl$ | 0.2 mol % | 0.2 mol % | |

The mobile dopant 9 in the optical fibre 50 is fluorine. The fluorine concentration 42 of 0.6 mol % represents an additional 0.543 mol % compared to the fluorine concentration 42 in the equivalent optical fibre 60 that has the same first refractive index profile 61. The mobile dopant concentration 19 is therefore 0.543 mol %. Such a fluorine concentration would depress the refractive index 5 of the glass 4 in the doped region 2 by a refractive index change 146, shown with reference to FIG. 1, of 0.00315. The refractive index change 146 is over 50% larger than the core delta Δ 147 of 0.002 shown with reference to FIG. 10. Such a refractive index change 146 would more than double the refractive index difference between the core 1 and the doped region 2 which would dramatically modify the guidance properties 39 of the optical fibre 10 were it not for the presence of the concealed dopant 8. It was therefore necessary to use a germania concentration 41 of 1.9% to compensate or balance the refractive index change 146 induced by the fluorine. As shown in FIG. 3, the diffusion coefficient 172 of fluorine is higher than the diffusion coefficient 177 of germania. The diffusion coefficient 179 of fluorine in silica doped with phosphorus pentoxide, as used in the optical fibre 50, is even higher. Each of the balancing and the mobile dopants 8, 9 are present at significantly higher concentrations than required to obtain the first refractive index profile 61.

Incorporating dopants into glass at concentrations much higher than required to provide the desired first refractive index profile 61 is generally undesirable because glasses with higher dopant concentrations are more expensive, are more difficult to make, often have higher losses, and the higher dopant concentrations can cause devitrification of the glass which results in higher scattering losses. Moreover, increased dopant concentration can cause additional thermal stress in the glass which can lead to the optical fibre preform shattering during manufacture, and undesired fibre drawing-induced refractive index changes.

Figure 7:
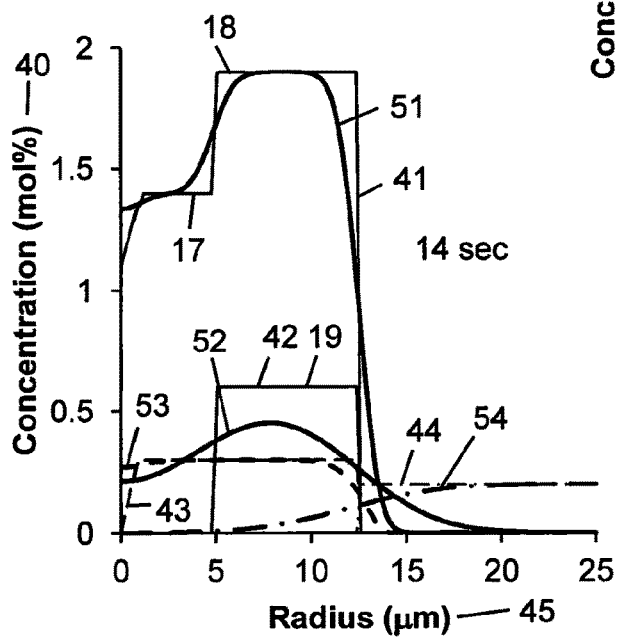

The dopant diffusion in the optical fibre 50 was modelled with a computer simulation. FIG. 7 shows the results of a computer simulation of the dopant concentrations. The germania concentration 51, fluorine concentration 52, phosphorus pentoxide concentration 53, and chlorine concentration 54 after diffusing at a temperature of 2050 C for 14 seconds are shown by the solid lines. Fluorine has diffused from the doped region 2 into the core 1. The initial fluorine concentration 41 was zero in the core 1.

Figure 8:
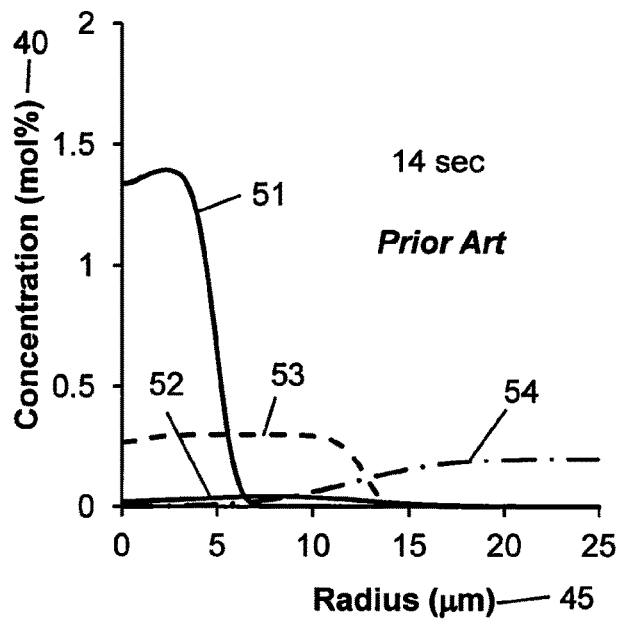

The same computer simulation was run for the optical fibre 60 of FIG. 6. The results are shown in FIG. 8. Fluorine has diffused into the core 1, but the fluorine concentration 52 is very much less in FIG. 8 than in FIG. 7.

Chlorine also diffused in the results shown in FIGS. 7 and 8. The chlorine concentration 54 is substantially the same in each case.

Figure 9:
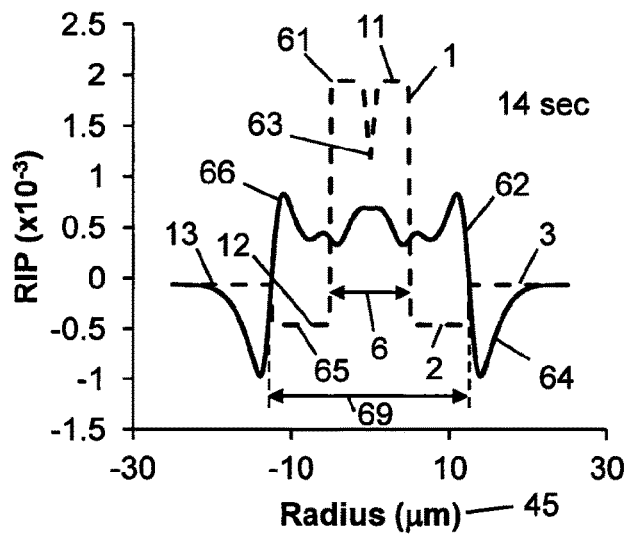

FIG. 9 shows the calculated first refractive index profile 61 of the optical fibre 50 before heating (dashed line), and the calculated first refractive index profile 62 at 25 C after heating to 2050 C for 14 seconds (solid line). The refractive index profile 61 has been level shifted such that zero represents the third refractive index 13 of the cladding 3. The same approach was taken with other refractive index profiles described herein. The first refractive index profile 61 has a refractive index dip 63 caused by evaporation of the germania and phosphorus pentoxide during the preform collapse. The core 1, the doped region 2, and the cladding 3 are clearly visible. The doped region 2 is a depressed cladding 65 which is slightly depressed in refractive index with respect to the refractive index 13 of the cladding 3. The refractive index profile 62 has a depressed cladding region 64 owing to diffusion of fluorine from the doped area 2 into the cladding 3. Heating at 2050 C for 14 seconds has reduced the refractive index 11 of the core 1 and increased the refractive index 12 of the doped region 2 resulting in a core 66 having a core diameter 69 that is greater than the first core diameter 6 prior to heating.

Figure 10:
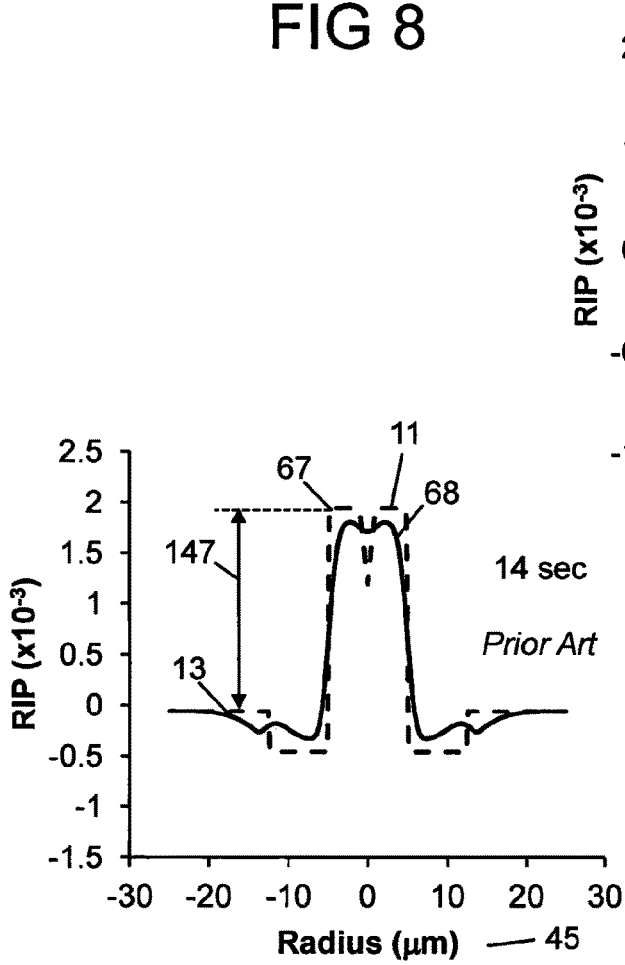

FIG. 10 shows the calculated refractive index profile 67 of the optical fibre 60 before heating (dashed line) and the calculated refractive index profile 68 after heating (solid line) to 2050 C for 14 seconds. The core 1 has diffused slightly, but substantially less than for the optical fibre 50.

Figure 11:
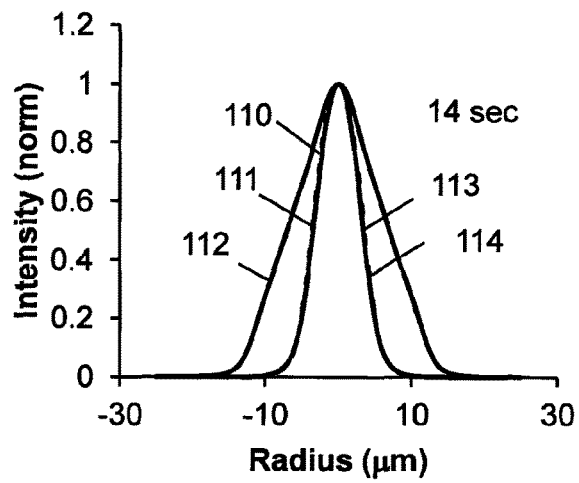

FIG. 11 shows the calculated optical power distributions 111, 112, 113, 114, normalized to unity, for the fundamental modes 110 supported by the refractive index profiles 61, 62, 67 and 68 respectively. The optical power distributions 111 and 113 overlay each other confirming that the refractive indices 61 and 67 provide the same optical power distributions. The optical power distribution 112 of the optical fibre 50 after heating is much wider than the optical power distribution 111 before heating. The optical power distribution 114 of the optical fibre 60 after heating is nearly the same as the optical power distribution 113 before heating. The increase in the size of the optical power distribution induced by heating for 14 seconds is evidently very much greater for the optical fibre 50 of FIG. 5 than for the optical fibre 60 of FIG. 6.

Table 3 shows calculated values of effective mode area, the mode field diameter, and beam quality of the pristine fibres (before heating) and the diffused fibres (after heating) for the fundamental modes 110 supported by the optical fibres 50 and 60. The mode field diameters 115, 116 before and after heating are shown in FIG. 1. The beam quality is shown as the $M^2$ value, where an $M^2=1$ represents a pure Gaussian fundamental mode. The effective mode area has increased by a factor of 4.8, the mode field diameter by 2.1, and there has been a negligible degradation in beam quality $M^2$ value. Incorporating the balancing and mobile dopants 8, 9 into the optical fibre 50 has resulted in a significant increase in mode field diameter compared to the optical fibre 60. The optical fibre 60 would need to be heated for much longer than 14 seconds, and tapers or intermediate fibres used in a low loss splice to another fibre having a mode field diameter of approximately 22.5 m.

Table 3 also includes the values of the figure-of-merit FoM calculated in accordance with Equation 1 for the optical fibres 50 and 60. The FoM value of 225.2 for optical fibre 50 is significantly higher than has been obtainable with the prior art. This demonstrates that inclusion of the concealed dopant 8 enables much larger changes in mode field diameter 115 for similar concentrations of fluorine, or alternatively, much smaller concentrations of fluorine are required to achieve the same changes in mode field diameter 115.

TABLE 3

Calculated fundamental mode parameters

| | Optical fibre 50 of FIG. 5 | | Optical fibre 60 of FIG. 6 | |
|---|---|---|---|---|
| | Pristine | Diffused | Pristine | Diffused |
| Effective mode area ($\mu m^2$) | 87 | 419 | 91 | 98 |
| Mode field diameter ($\mu m$) | 10.6 | 22.3 | 11.3 | 12 |
| Beam quality $M^2$ | 1.02 | 1.06 | 1.02 | 1.03 |
| FOM | 225.2 | | 16.88 | |

Figure 12:
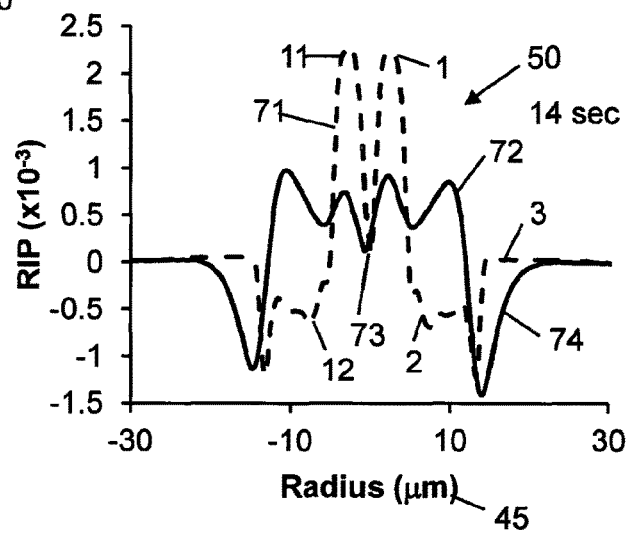
FIG. 12 shows the refractive index profile of an optical fibre that was fabricated according to the design used in FIGS. 5 to 11.

The optical fibre 50 was manufactured according to the design described with reference to FIGS. 5 and 9. FIG. 12 shows the measured refractive index profile 71 before heating (dashed line), and the measured refractive index profile 72 at 25 C after heating in a fusion splicer to 2050 C for 14 seconds (solid line) of the optical fibre 50. A refractive index dip 73 is present, as expected from FIG. 7. Heating at 2050 C for 14 seconds has caused fluorine to diffuse from the doped region 2 into the core 1, thus reducing the refractive index 11 of the core 1, and increasing the refractive index 12 of the doped region 2. Fluorine has also diffused into the cladding 3, leading to a depressed refractive index region 74. The calculated refractive index profiles 61, 62 are very similar to the measured refractive index profiles 71, 72 thus validating the theoretical analysis method.

Referring again to FIG. 4, the optical fibre 50 was used in place of the optical fibre 10. The optical fibre 50 was designed to provide a low loss fusion splice 29 with the optical fibre 22. The optical fibre 22 had the core diameter 28 equal to approximately 25 $\mu m$. The core diameter 6 of the optical fibre 50 was approximately 10 $\mu m$, which is smaller than the core diameter 28 of the second optical fibre 22. The optical fibre 22 was an active fibre, with the core 27 being doped with oxides of cerium, ytterbium, and aluminium.

Figure 13:
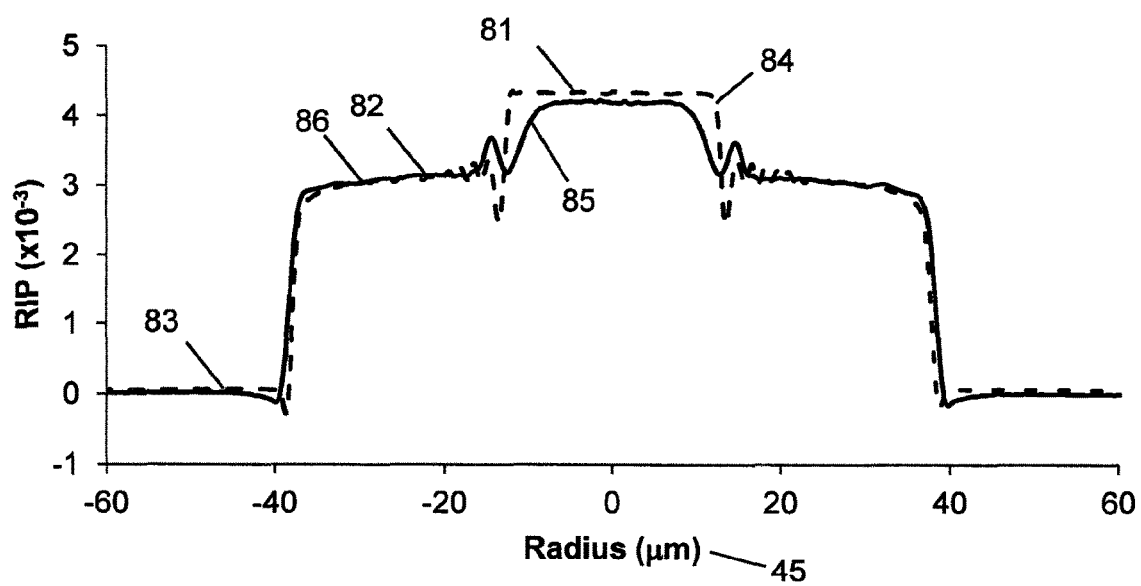
FIGS. 13 to 17 show a splice between the 10 μm core diameter optical fibre of FIG. 12 and an active cerium doped optical fibre having a 25 μm core diameter.

FIG. 13 shows the measured refractive index profile (RIP) 84 before heating (dashed line), and the measured refractive index profile 85 at 25 C after heating (solid line) to 2050 C for 11 seconds for the second optical fibre 22. The second optical fibre 22 had a core 81 that is doped with oxides of aluminium, cerium and ytterbium, a pedestal 82 that is doped with germania, and a silica cladding 83. The pedestal 82 is a raised refractive index cladding. The core 81 can support a fundamental mode that is guided against the pedestal 82. The second optical fibre 22 was not made using modified chemical vapour deposition (MCVD) and thus there is no refractive index dip 73 at the centre, where the radius 45 equals zero. The refractive index profiles 84 and 85 are very similar indicating that there is significantly less diffusion occurring in the second optical fibre 22 than occurred with the optical fibre 10 described with reference to FIG. 5.

Figure 14:
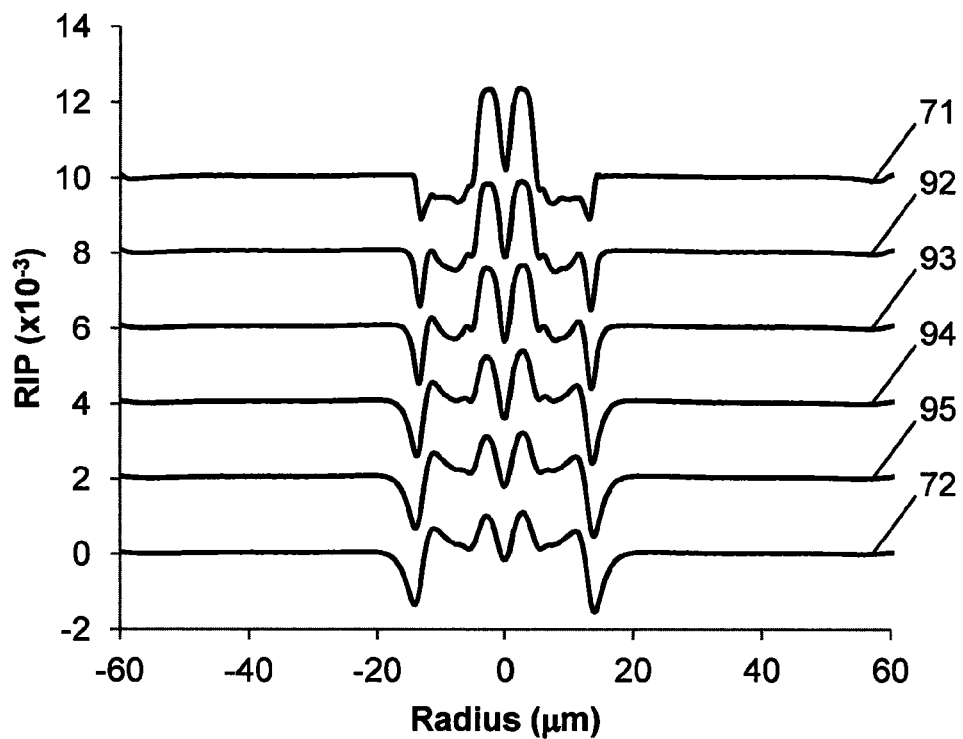
Figure 15:
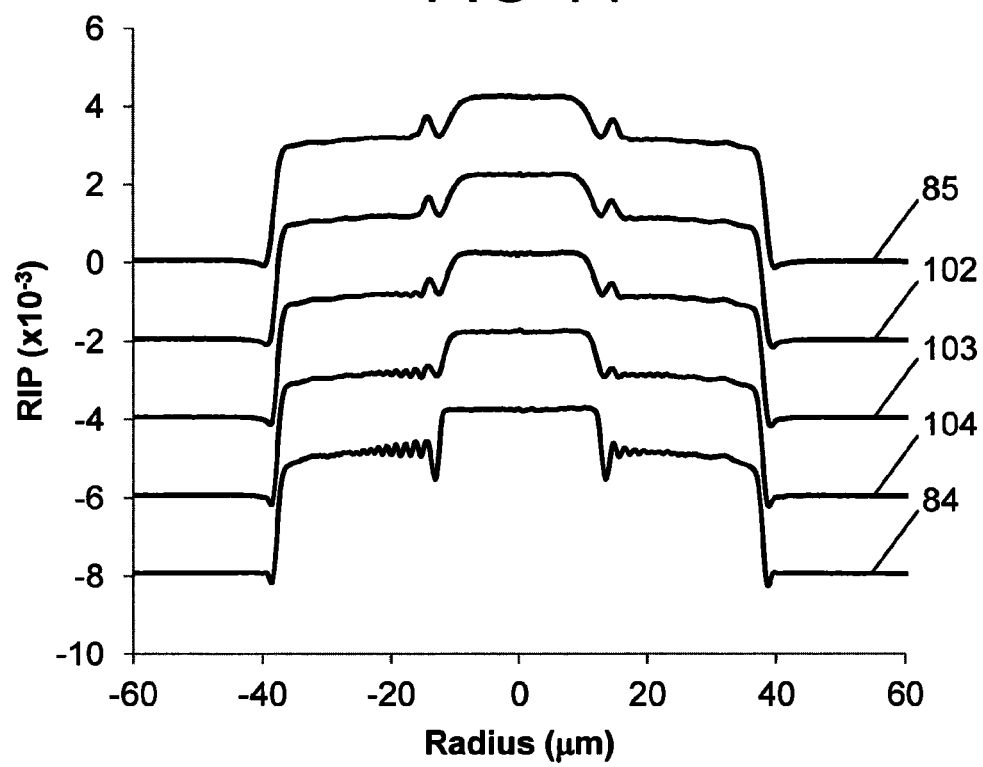
Figure 16:
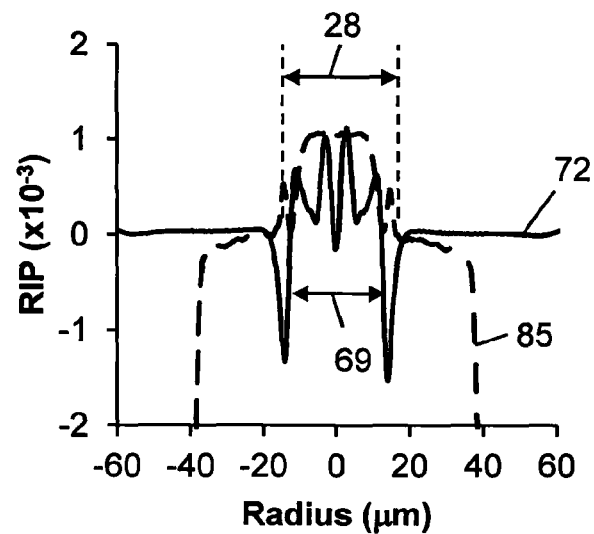

The optical fibre 50 and the second optical fibre 22 were fusion spliced together at 2050 C for approximately 11 seconds whilst monitoring the throughput power. FIG. 14 shows refractive index profiles 71, 92, 93, 94, 95 and 72 of the optical fibre 50 measured at distances 34 from the splice 29 defined in FIG. 4. The refractive index profiles are shown offset from each other for clarity. The distances 34 corresponding to FIGS. 71, 92, 93, 94, 95 and 72 were 800 $\mu m$, 450 $\mu m$, 350 $\mu m$, 200 $\mu m$, 100 $\mu m$ and 20 $\mu m$ respectively. The refractive index profiles 71 and 72 were previously discussed with reference to FIG. 12. FIG. 15 shows refractive index profiles 85, 102, 103, 104 and 84 measured at distances 20 $\mu m$, 200 $\mu m$, 300 $\mu m$, 400 $\mu m$ and 800 $\mu m$ from the splice 29 in the second optical fibre 22. The refractive index profiles are shown offset from each other for clarity. As shown with reference to FIG. 4, the core diameter 32 of the optical fibre 50 expands along the taper 31. FIG. 16 shows the refractive index 72 superimposed on the refractive index 85 after adjusting for differences in absolute refractive index. The core diameter 69 of the optical fibre 50 after heating is substantially equal to the core diameter 28 of the second optical fibre 22.

Referring to FIG. 12, it is difficult to determine the core diameters 32 for such complex refractive index profiles 72, 85. More practical measures are the mode field diameter 115 and the effective mode area 121 (shown with reference to FIG. 17) which can be measured using industry standard instrumentation, or calculated from the refractive index profiles shown in FIGS. 14 and 15. In the calculations described herein, the mode field diameter 115 has been taken as the beam diameter as defined in the international standard BS EN ISO 11146-1:2005 (formula 23) by computing the second order moment of the mode distribution. The mode field diameter 115 gives a meaningful measure of the size of the mode, and is particularly useful for estimating splice losses when joining two fibres together. The effective mode area 121 is a measure of the area over which the power of the mode is distributed. It is particularly useful to determine how much power the core can carry without causing non-linear type signal losses. The effective mode area is further described in Agraval "Nonlinear fiber optics", Academic Press, page 44, formula 2.3.29. The concepts of mode field diameter 115 and effective mode area 121 can be adapted to fibres regardless of their refractive index profiles, and are thus widely used in the industry.

Figure 17:
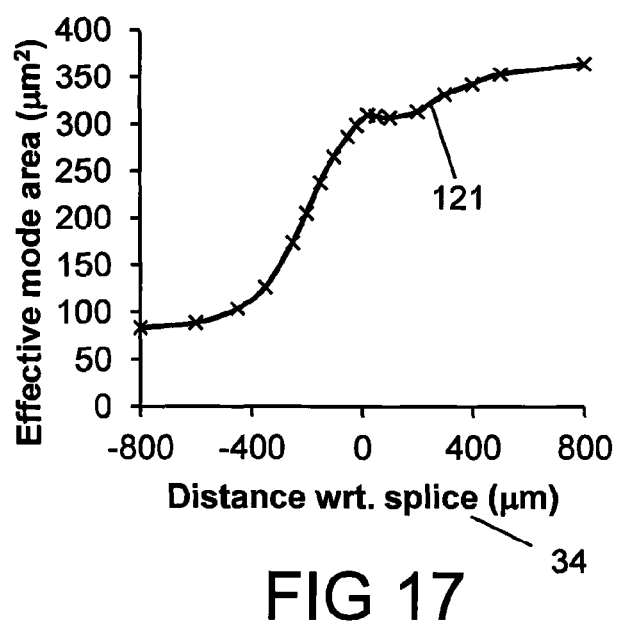

FIG. 17 shows the effective mode area 121 as a function of the distance 34 from the splice 29 shown in FIG. 4. Negative values of the distance 34 correspond to the optical fibre 50, and positive values of the distance 34 correspond to the second optical fibre 22. FIG. 17 shows that the effective mode area 121 increased from approximately 90 $\mu m^2$ to approximately 300 $\mu m^2$ at the splice 29. This increase was induced by heating the optical fibre 50 for 11 seconds at 2050 C, at which time the fusion splicer was switched off. As shown in Table 3, if the heating had been continued, the effective mode area 121 would have increased further to approximately 400 $\mu m^2$. The increase in the effective mode area 121 is gradual, which is advantageous in that a gradual increase results in an adiabatic taper. Adiabatic tapers have lower losses and lower conversion to higher order modes than non-adiabatic tapers. The fusion splice 29 between the optical fibre 50 and the second optical fibre 22 is such that the effective mode areas 121 of the optical fibre 50 and the second optical fibre 22 are equal at the splice 29.

The design of the optical fibre 50 is shown to allow low loss splicing between fibres with significantly different core diameters and different effective areas without the need for tapering the diameter of the fibre cladding 3. This may simplify the manufacturing process of a laser based on the optical fibre 50 because no tapering equipment is required to launch into the large core laser delivery fibres that are typically required to reduce optical non-linearities. The design of the optical fibre 50 does not require extremely large concentrations of the mobile dopant 9 (fluorine) to be incorporated in the fibre, such as the 4 mol % fluorine concentration described in U.S. Pat. No. 6,690,868. The lower fluorine concentration of this Example thus simplifies the fibre manufacturing process and makes the diffusion process more reliable. It also reduces the duration of the heat treatment to achieve the required diffusion for a given concentration of the mobile dopant 9, which is especially beneficial for changes in core diameter 6 of at least 2 times is desired.

Example 2

Figure 18:
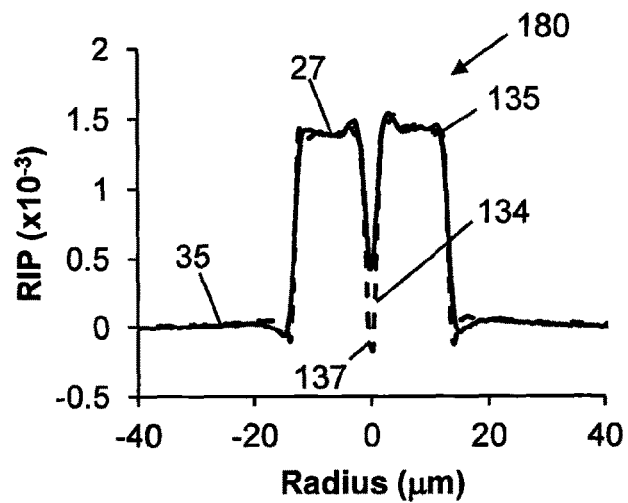
FIGS. 18 to 21 show a splice between the 10 μm diameter core optical fibre used in FIG. 12 and a passive optical fibre having a 25 μm diameter.

Referring again to FIG. 4, the second optical fibre 22 used in this example was a passive optical fibre 180 shown in FIG. 18. The optical fibre 10 was the optical fibre 50 of FIGS. 5 and 12 and Example 1. The optical fibre 180 had the core diameter 28 equal to approximately 25 µm. The optical fibre 180 was a passive fibre comprising no rare-earth dopant. The core 27 was doped with germania, resulting in a core comprising germanium doped silica.

FIG. 18 shows the measured refractive index profiles (RIP) 134 before heating (dashed line) of the optical fibre 180. The core 27 includes a refractive index dip 137 at the centre, which dip is typical of optical fibres made from modified chemical vapour deposition (MCVD). The measured refractive index profile 135 was measured at 25 C after heating (solid line) to 2050 C for 14 seconds. The refractive index profiles 134 and 135 are very similar indicating that there is significantly less diffusion occurring in the optical fibre 180 than occurred with the optical fibre 50 of FIG. 12.

Figure 19:
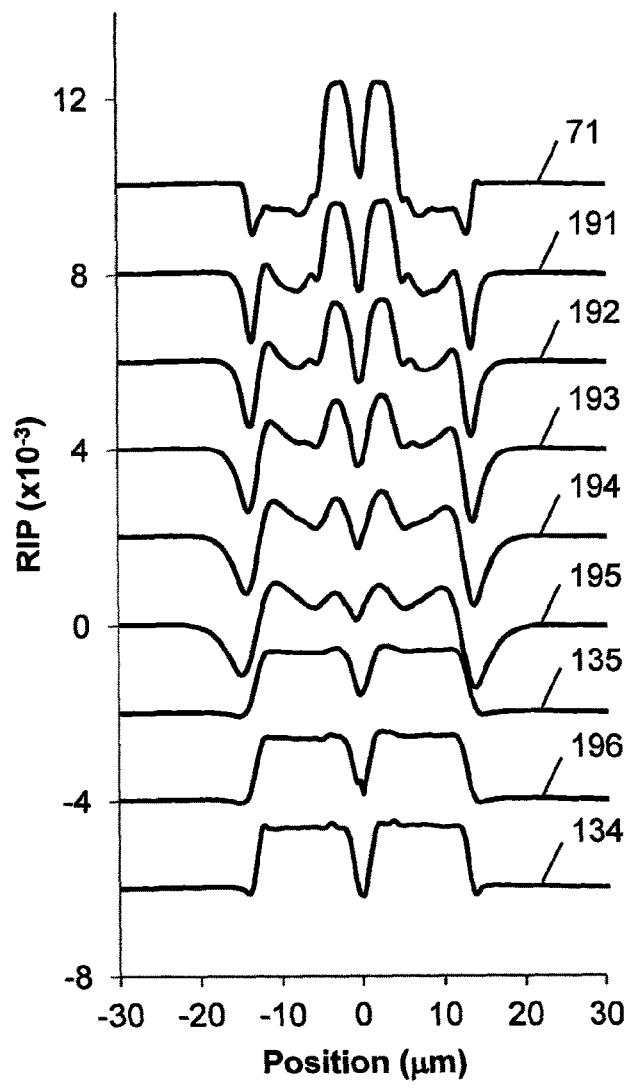
Figure 20:
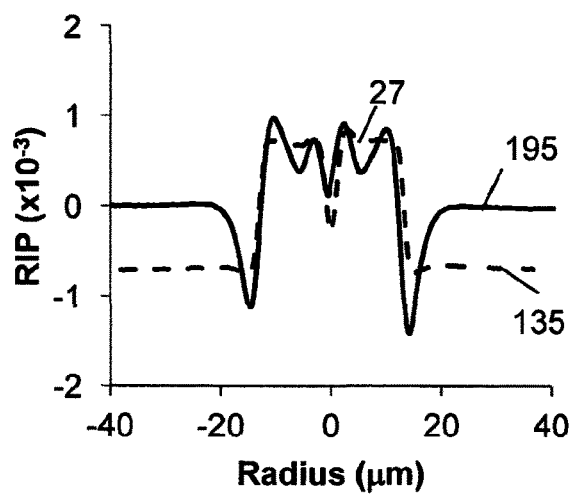

FIG. 19 shows the measured refractive index profiles 71, 191, 192, 193, 194, 195 measured in the optical fibre 50 of FIG. 12 at distances 34 of −800 µm, −420 µm, −320 µm, −220 µm, −120 µm, and −20 µm from the splice 29, and the measured refractive index profiles 135, 196, 134 measured in the optical fibre 180 of FIG. 18 at distances 34 of 20 µm, 200 µm, and 500 µm from the splice 29. The refractive index profiles have been level shifted for clarity. FIG. 20 shows an overlay of the refractive index profiles 135 (dashed line) and the refractive index profile 195. The refractive index profiles 135, 195 substantially overlay each other in the region of the core 27 of the fibre 180.

Figure 21:
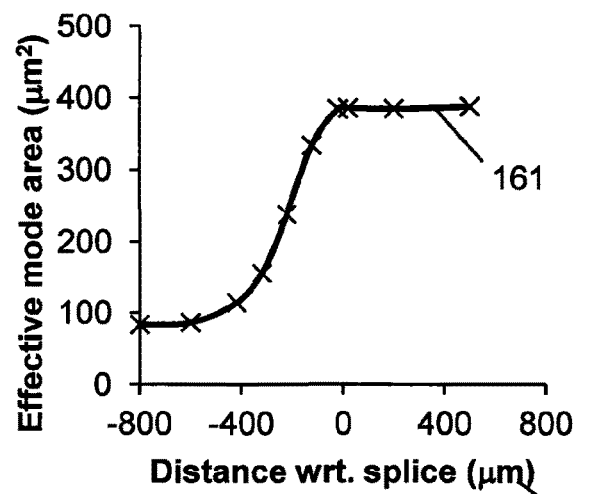

FIG. 21 shows the effective mode area 161 versus the distance 34 from the splice 29 that was calculated from the measured refractive index profiles such as those shown in FIG. 19. The effective mode areas 161 of the fundamental modes of the optical fibre 50 and the second optical fibre 180 are substantially equal at the distance 34 equal to zero, corresponding to the splice 29 shown in FIG. 4. The effective mode area 161 of the fundamental mode of the second optical fibre 180 changes very little within the splice region 30. The effective mode area 161 at the splice 29 was approximately 390 µm², which is slightly more than in FIG. 17. The larger effective mode area was achieved by heating the optical fibres for slightly longer while splicing.

A fibre designed according to this example may be used to launch into a passive fibre with much larger core diameter 28 in order to reduce the effect of optical non-linearities in high power lasers. The taper 31 can be made adiabatic in order to achieve low losses, which are important in high power lasers for power budget and laser reliability. An adiabatic taper is also useful to ensure low loss coupling from the fundamental modes without resulting in coupling to higher order modes. A splice loss less than 0.5 dB is readily achievable while preserving a beam quality $M^2<1.2$. This is particularly important in case the second optical fibre 22 is a multi-mode fibre.

Example 3

Figure 22:
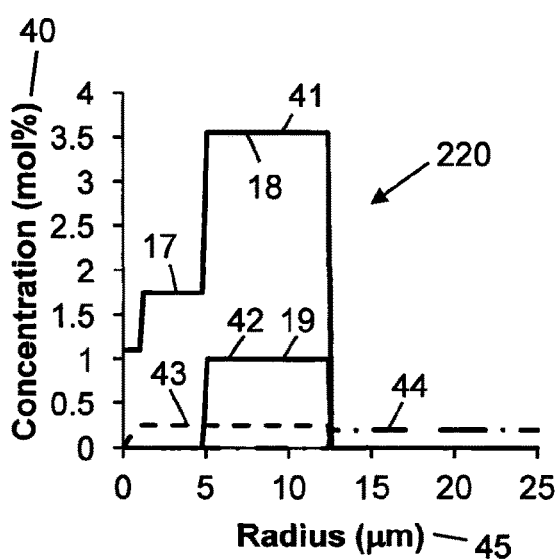
FIGS. 22 to 31 show examples of an optical fibre in which the optical power distribution of the fundamental mode changes from a Gaussian, to a top hat, to a doughnut with heating.

FIG. 22 shows a design of an optical fibre 220 that is similar to the optical fibre 50 of FIG. 5, but where the fluorine concentration 42 has been increased from 0.6 mol % to 1 mol %. The germania concentration 41 in the doped region 2 was increased to offset the depression in the refractive index 5 induced by the fluorine. The germania concentration 41 was 3.55 mol % in the doped region 2, and 1.75 mol % in the core 1, which corresponds to a concentration ratio of the concealed dopant (germania) concentration 18 in the doped area 2 to the first dopant concentration 17 of the first dopant 7 (germania) in the core 1 of approximately two.

Figure 23:
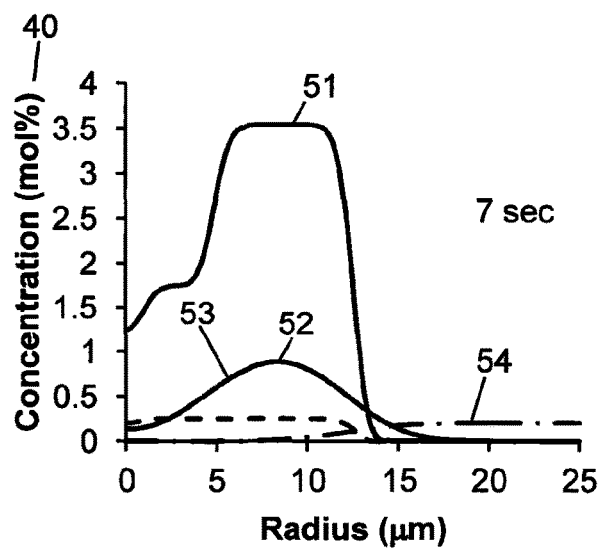
Figure 24:
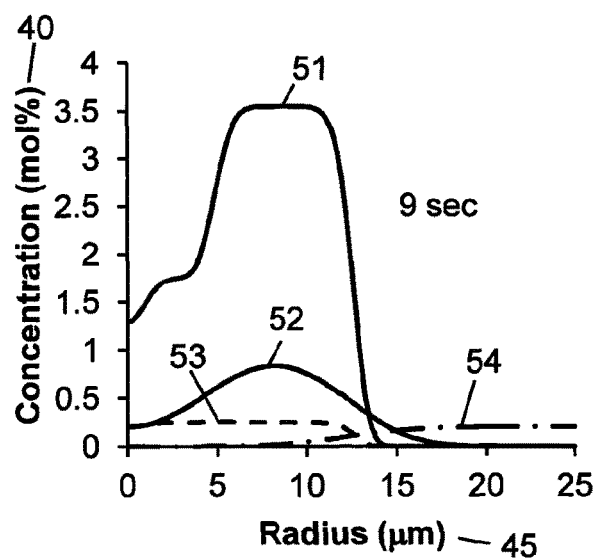
Figure 25:
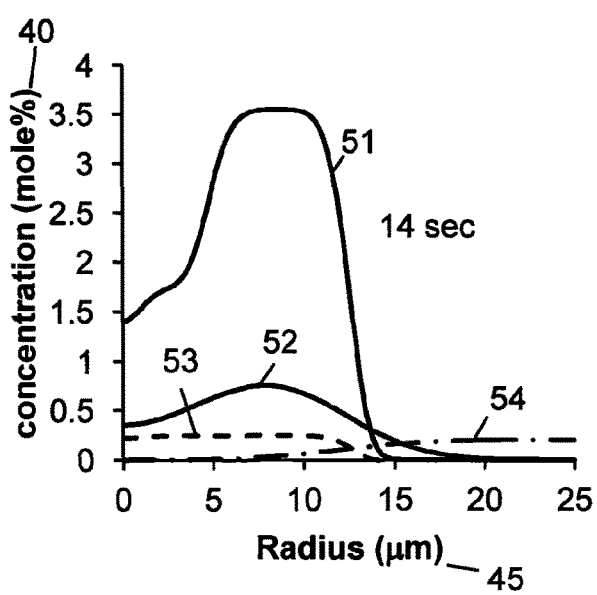

FIGS. 23 to 25 show the calculated germania concentration 51, fluorine concentration 52, phosphorus pentoxide concentration 53, and chlorine concentration 54 after diffusing at a temperature of 2050 C for 7, 9, 14 seconds respectively. The initial fluorine concentration 41 was zero in the core 1. The amount of fluorine diffusing out of the doped area 2 and into the core 1 increases with time.

Figure 26:
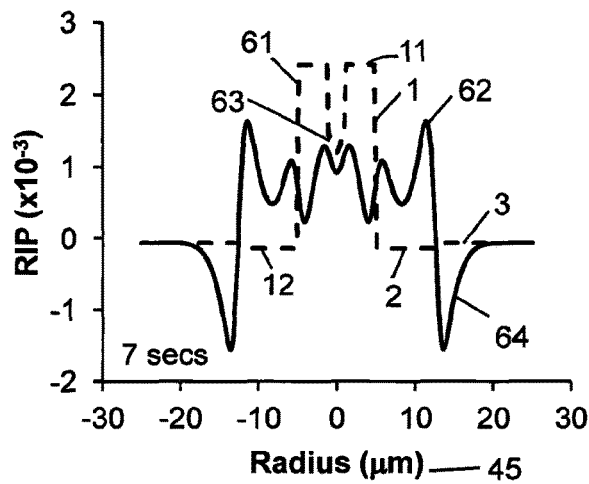
Figure 27:
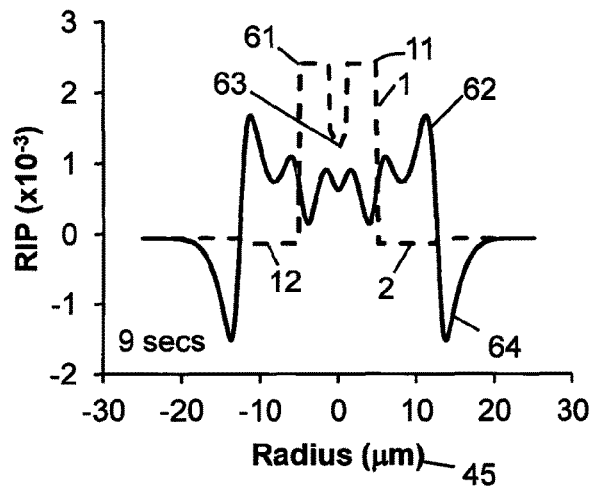
Figure 28:
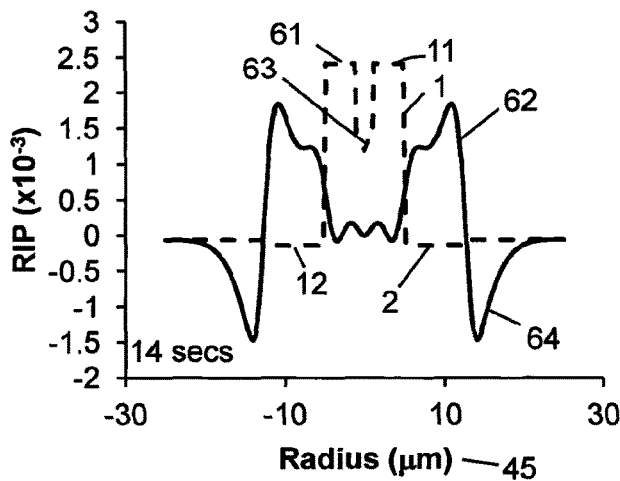

FIGS. 26 to 28 show the first refractive index profile 61 (dashed line) and the second refractive index profiles 62 (solid line) corresponding to the diffused dopant profiles shown in FIGS. 23 to 25. The refractive index 11 of the core 1 reduces with time that heat is applied, and the refractive index 12 of the doped region 2 increases with time. The corresponding optical power distributions 111, 112 are shown in FIGS. 29 to 31, and the calculated mode field parameters are shown in Table 4.

Figure 29:
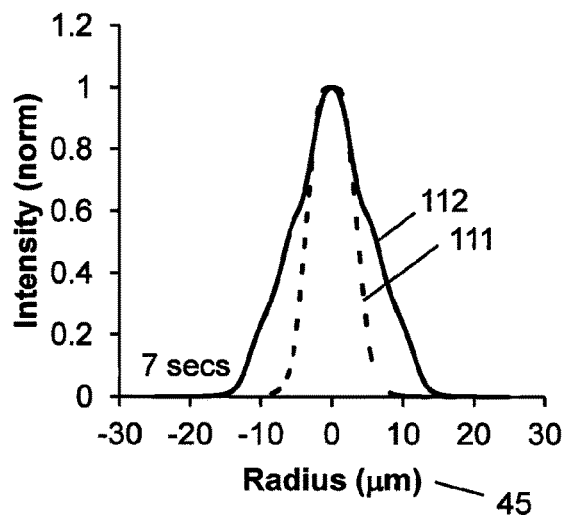

As shown in FIGS. 23, 26 and 29, increasing the fluorine concentration 42 has reduced the time taken for the average refractive index 11 to become approximately equal to the average refractive index 12 from 14 seconds (FIG. 9) to 7 seconds (FIG. 29). The mode field diameter 115, 116 has increased from 11.2 µm to 21.1 µm. The beam quality factor $M^2$ has increased from 1.02 to 1.09.

Figure 30:
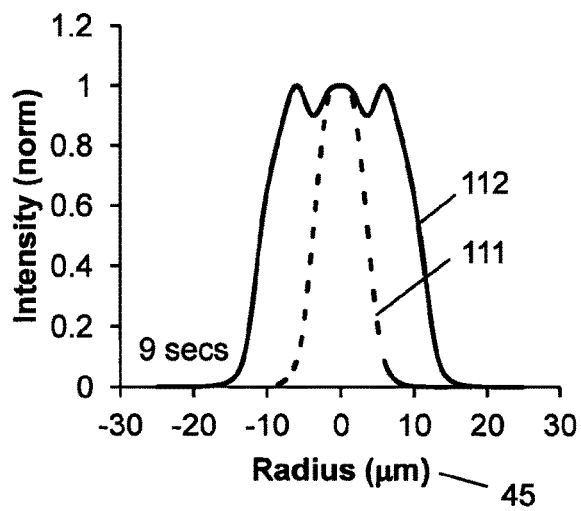

As shown in FIGS. 24, 27 and 30, heating for 9 seconds has resulted in the average refractive index 11 becoming less than the average refractive index 12. The resulting optical power distribution 112, FIG. 30, is approximately flat topped. The mode field diameter 116 has increased slightly to 21.8 µm, and there has been a change in the beam quality $M^2$ factor to 1.25. Flat topped optical power distributions are advantageous in certain marking and cutting applications as the width of the mark or cut can be better controlled.

Figure 31:
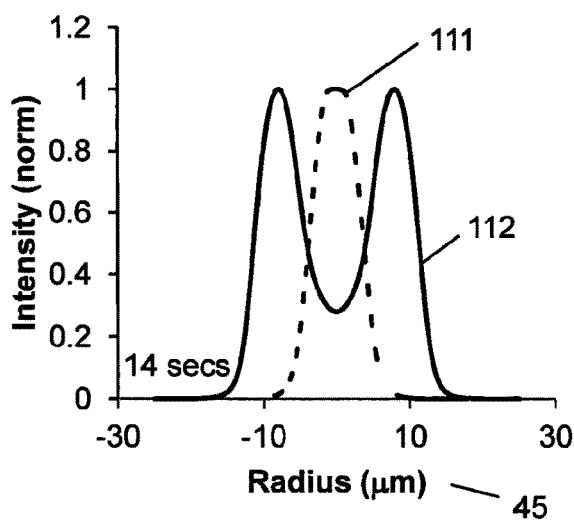

As shown in FIGS. 25, 28, and 31, heating for 14 seconds has resulted in a refractive index profile 62, FIG. 28, that resembles a ring. The resulting optical power distribution, 112, FIG. 31, of the fundamental mode is a doughnut or ring mode. Doughnut modes are advantageous in certain cutting applications. For example, a fundamental doughnut mode can be coupled into either a ring core fibre, or a multimode optical fibre. If the multimode optical fibre is such that its optical modes are not coupled together, the multimode optical fibre can deliver a ring-shaped power distribution to a work piece via a focussing system.

TABLE 4

Calculated mode field parameters and figure of merit (FoM) for the results shown in FIGS. 26 to 31.

|  | Pristine | 7 secs | 9 secs | 14 secs |
|---|---|---|---|---|
| Effective mode area ($\mu m^2$) | 93 | 387 | 482 | 482 |
| Mode field diameter ($\mu m$) | 11.2 | 21.1 | 21.8 | 25.2 |
| Beam quality $M^2$ | 1.02 | 1.09 | 1.25 | 1.6 |
| FoM | — | 133.5 | 155.6 | 219.3 |

The changes in beam quality $M^2$ reported in Table 4 are much greater than obtained by prior art fibre designs, and are achieved by simple heat treatment of the optical fibre 220 in order to obtain the taper 33 of FIG. 4. The heat treatment enabled the optical power distribution 111 of the fundamental mode having a Gaussian distribution to be converted to an optical power distribution 112 of the fundamental mode that had a triangular, flat top, and then doughnut power distributions. These were all achieved with an adiabatic transition and therefore low loss and low conversion to higher order modes.

The ability to provide such large changes in the $M^2$ value by heating is an advantage of the present invention. In order to achieve low splice losses of the fundamental modes guided by two optical fibres, it is necessary to match the size and shape of the fundamental modes. The optical fibre 10 may have a fundamental mode defined by an $M^2$ value prior to heating less than 1.15, and a fundamental mode defined by an $M^2$ value after heating that is at least 1.2. The $M^2$ value after heating may be at least 1.3. The $M^2$ value after heating may be at least 1.5. The $M^2$ value is a measure of the beam quality, an $M^2$ value of 1.0 corresponding to a Guassian beam. The $M^2$ value is a measure of the shape of the fundamental mode, the higher the $M^2$ value, the less Gaussian the mode.

Example 5

Figure 32:
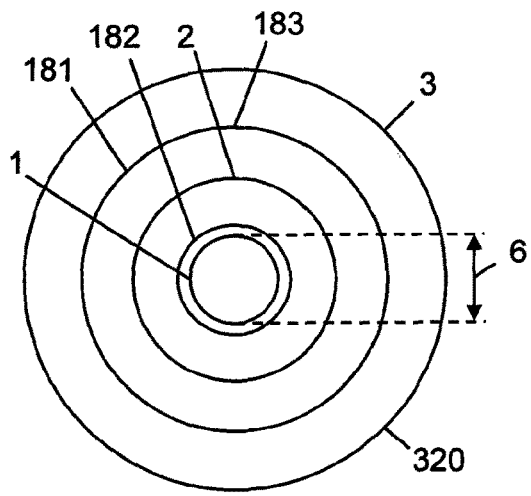
FIGS. 32 to 37 show an example of an optical fibre having a pedestal in which the mode field diameter of the fundamental mode decreases with heating.
Figure 34:
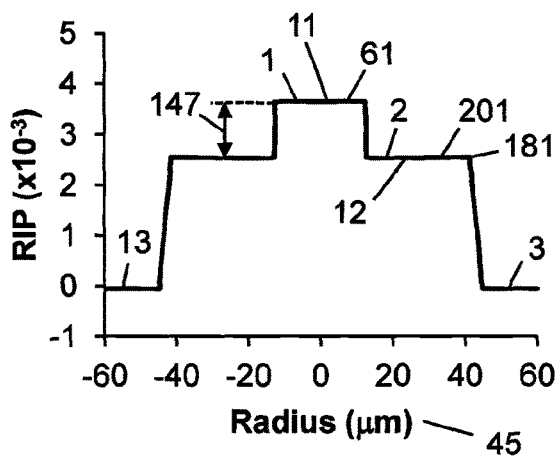

FIG. 32 shows an optical fibre 320 that is designed to reduce the effective first diameter 6 of the core 1 upon heating. The optical fibre 320 comprises the core 1, a pedestal 181, and the cladding 3. The pedestal 181 comprises an optional inner pedestal 182, the doped region 2, and outer pedestal 183. FIG. 34 shows the first refractive index profile 61 before heating. The concentrations of the dopants are shown in Table 5, together with the chemical formula of each functional unit.

Figure 33:
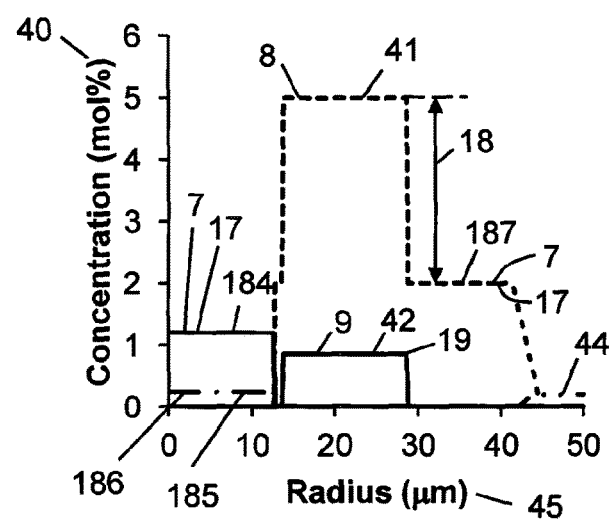

FIG. 33 shows the dopant concentration 40 in mole percent versus radius 45 in microns. The glass 4 was silica. The first dopant 7, required to obtain the first refractive index profile 61 of FIG. 34, comprised germania, alumina, chlorine, and oxides of ytterbium, and cerium. The ytterbium concentration 185 was the same as the cerium concentration 186. The alumina concentration 184 was higher than the ytterbium concentration 184 and the cerium concentration 185. The glass 4 was silica glass having a chlorine concentration 44 in the cladding 3. The germania concentration 41 comprised a concentration 187 of 2 mol % throughout the pedestal 181 representing the first dopant concentration 17 in the pedestal 181.

The mobile dopant 9 was fluorine. The fluorine concentration 42 had the mobile dopant concentration 19 in the doped region 2. The concealed dopant 8 was germania. The germania concentration 41 of 5 mol % in the doped region 2 comprised the concentration 187 of 2 mol % plus the concealed dopant concentration 18 of 3 mol % that was required to balance the refractive index change 146 induced by the mobile dopant 9.

TABLE 5

Dopant Concentrations

| Location | Dopant | Chemical Formula | Concentration |
|---|---|---|---|
| Core | Alumina | $GeO_2$ | 1.2 mol % |
| Core | Ytterbium | $Yb_2O_3$ | 0.15 mol % |
| Core | Cerium | $CeO_2$ | 0.1 mol % |
| Inner pedestal | Germania | $GeO_2$ | 2.0 mol % |
| Doped region | Germania | $GeO_2$ | 5.0 mol % |
| Doped region | Fluorine | $SiO_{1.5}F$ | 0.86 mol % |
| Outer Pedestal | Germania | $GeO_2$ | 2.0 mol % |
| Cladding | Chlorine | $SiO_{1.5}Cl$ | 0.2 mol % |

Figure 37:
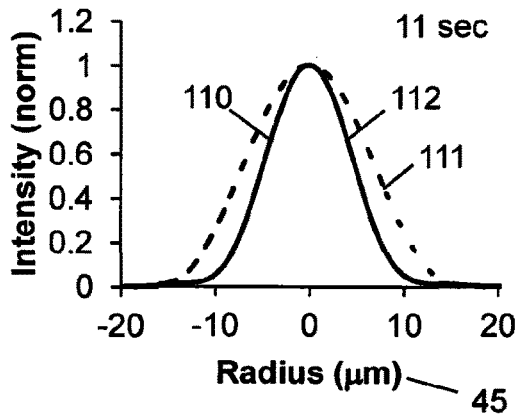

FIG. 34 shows the calculated first refractive index profile 61 before heating. The first refractive index profile 61 is offset by the refractive index 13 of the cladding 3, which was synthetic silica comprising chlorine doped glass. The first refractive index profile 61 was calculated by multiplying the dopant concentrations shown in FIG. 33 with the respective molar refractivities shown in Table 1. The core 1 has a refractive index 11 which is higher than the refractive index 201 of the pedestal 181. The refractive index 201 of the pedestal 181 is higher than the third refractive index 13 of the cladding 3. The balancing and mobile dopant concentrations 18, 19 in the doped region 2 are selected such the refractive index 12 of the doped region 2 is substantially the same as the refractive index 201 of the pedestal 181 outside the doped region 2. Thus the refractive index 201 of the pedestal 181 is substantially uniform. The core 1 guides against the pedestal 181, and thus the effective core delta Δ 147 is the difference between the core refractive index 11 and the pedestal refractive index 201. FIG. 37 shows the optical power distribution 111 of the fundamental mode 110 guided by the core 1 before heating.

Figure 35:
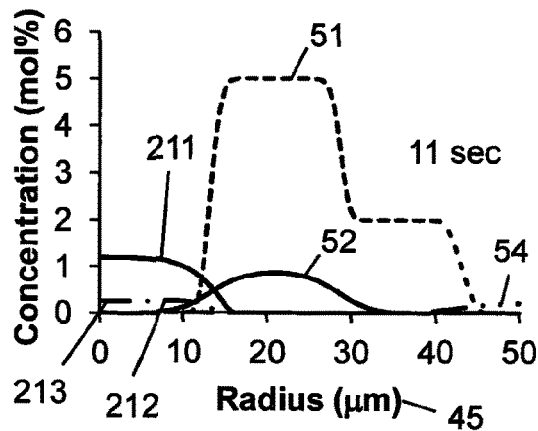

FIG. 35 shows the calculated germania concentration 51, fluorine concentration 52, chlorine concentration 54, alumina concentration 211, ytterbium concentration 212 and cerium concentration 213 after heating at 2050 C for 11 seconds. The fluorine has diffused more than the germanium, alumina, ytterbium and cerium.

Figure 36:
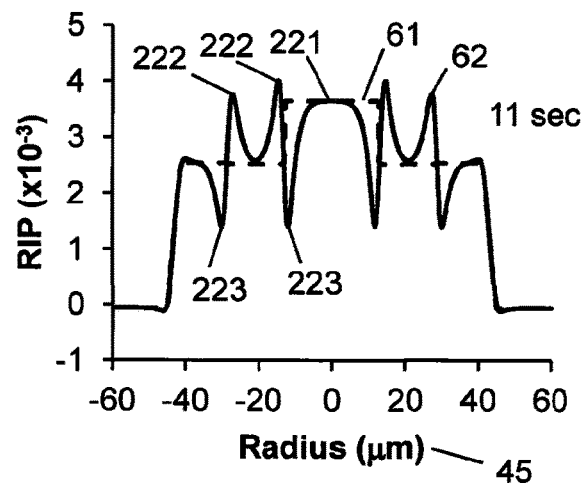

FIG. 36 shows the calculated first refractive index profiles 61 before heating (dashed line), and the calculated second refractive index profile 62 at 25 C after heating at 2050 C for 11 seconds. Diffusion of the fluorine from the doped region 2 into the core 1 has caused the refractive index 11 of the core 1 of the optical fibre 320 prior to heating to reduce in at least a portion of the core 1. The resulting profile 62 of the heated fibre has a smaller core 221 than the core 1 of the fibre 320 prior to heating. The diffusion of the fluorine from the doped region 2 has also caused refractive index peaks 222 and refractive index depressions 223 in the pedestal 181. FIG. 37 shows the optical power distribution 111 of the fundamental mode 110 supported by the optical fibre 320 prior to heating, and the optical power distribution 112 after heating. The optical power distribution 111 has a mode field area of 390 $\mu m^2$ before heating, and the optical power distribution 112 has a mode field area of 233 $\mu m^2$ after heating. The fundamental mode 110 has a beam quality defined by an $M^2$ value equal to 1.02 prior to heating, and a beam quality defined by an $M^2$ value equal to 1.09 after heating. Advantageously, the optical fibre 320 can be used to splice to a second optical fibre that has a mode field diameter that is less than the mode field diameter 115 of the optical fibre 320. It should be noted that the refractive index peaks 222 and the refractive index depressions 223 will only occur where the optical fibre 320 has been heat treated and will have little detrimental effect provided that the transition from the first refractive index profile 61 to the second refractive index profile 62 is adiabatic.

The figure-of-merit FoM for the optical fibre 320 is equal to 30.9. The optical fibre 320 can be spliced to an optical fibre like the optical fibre 50 described in FIG. 5. It is possible to achieve an increase the effective area of the fundamental mode from 87 $um^2$ (as from Table 3) to 925 $um^2$ by properly scaling the core diameter of optical fibre 320 up to 42.5 um in a single splice and without any tapering of the fibre cladding diameter. This is an increase in mode field diameter from 10.6 um to 36.1 um.

Example 6

Figure 38:
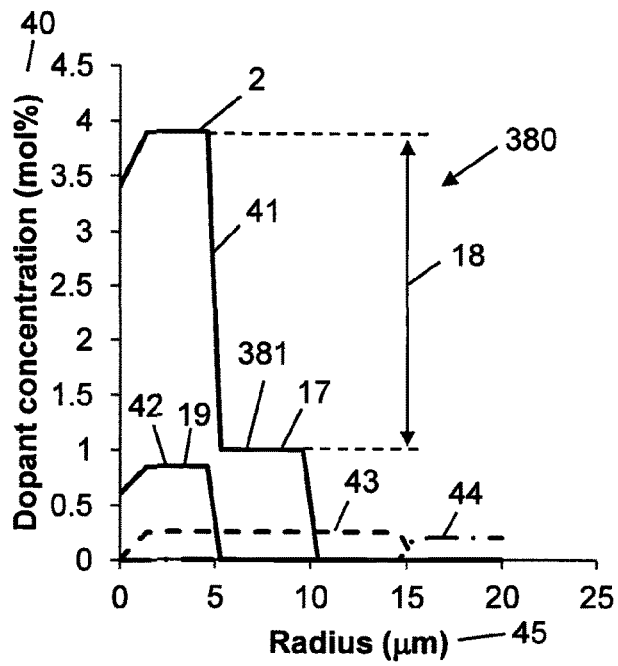
FIGS. 38 to 41 show an example of an optical fibre in which the mode field diameter of the fundamental mode decreases with heating.

FIG. 38 shows the dopant concentration 40 for an optical fibre 380 designed to reduce the mode field diameter 115 of the fundamental mode 110 upon heating. As shown by the first refractive index profile 61 in FIG. 40, the core 1 is a step index core comprising an outer core 381 and the doped region 2 which have substantially the same refractive index 11. The first and concealed dopants 7, 8 were germania, and the mobile dopant 9 was fluorine. The design was based on a fibre made with a synthetic silica capillary, and thus the cladding 3 at radii greater than 15 μm is made primarily from silica doped with chlorine. Phosphorus pentoxide has been added at radii less than 15 μm in order to compensate for the chlorine. The phosphorus pentoxide doping may also increase the diffusion rate of the fluorine dopant upon heating. The germania concentration 41 is raised for radii less than 5 μm compared to radii between 5 μm and 10 μm in order to compensate for the refractive index change 146 induced by the fluorine concentration 42 at radii less than 5 μm.

The germania, fluorine, phosphorus, and chlorine concentrations 41, 42, 43, 44 are shown in Table 6, save that the central refractive index dip and concentration gradients have been ignored for clarity. Also shown are the dopant concentrations for a fibre with the same first refractive index profile 61, shown with reference to FIG. 40, but without the mobile dopant 9, fluorine. The 3.9 mol % concentration of the germania concentration 41 in the doped region 2 thus represents the first dopant concentration 17 of 1 mol % required to achieve the first refractive index profile 61, plus an additional concealed dopant concentration 18 of 2.9 mol % required to balance the refractive index change 146 induced by the mobile dopant 9.

TABLE 6

Dopant Concentrations

| Location | Dopant | Chemical Formula | Concentration | Concentration without use of Fluorine | Difference in Concentration |
|---|---|---|---|---|---|
| 0 to 5 μm | Germania | $GeO_2$ | 3.9 mol % | 1 mol % | 2.9 mol % |
| 0 to 5 μm | Fluorine | $SiO_{1.5}F$ | 0.85 mol % | 0 mol % | 0.85 mol % |
| 0 to 5 μm | Phosphorus Pentoxide | $P_2O_5$ | 0.25 mol % | 0.25 mol % | 0 mol % |
| 5 to 10 μm | Germania | $GeO_2$ | 1 mol % | 1 mol % | 0 mol % |
| 5 to 10 μm | Phosphorus Pentoxide | $P_2O_5$ | 0.25 mol % | 0.25 mol % | 0 mol % |
| 10 to 15 μm | Phosphorus Pentoxide | $P_2O_5$ | 0.25 mol % | 0.25 mol % | 0 mol % |
| >15 μm | Chlorine | $SiO_{1.5}Cl$ | 0.2 mol % | 0.2 mol % | 0 mol % |

Figure 39:
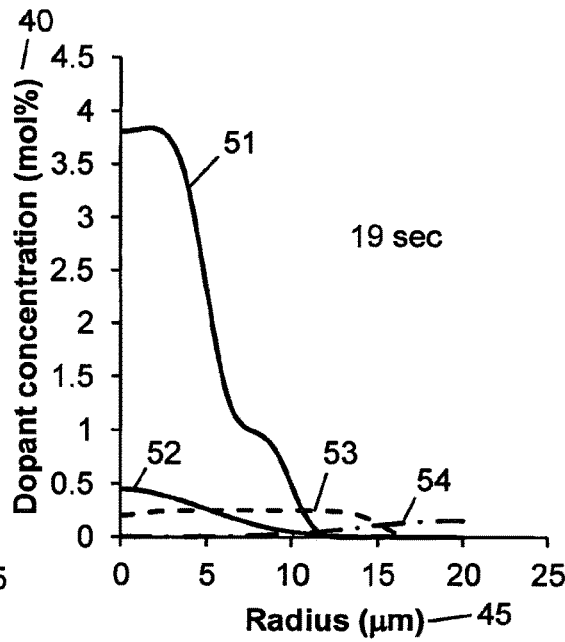

FIG. 39 shows the germania, fluorine, phosphorus pentoxide, and chlorine concentrations 51, 52, 53, 54 after heating the fibre for 19 seconds at 2050 C.

Figure 40:
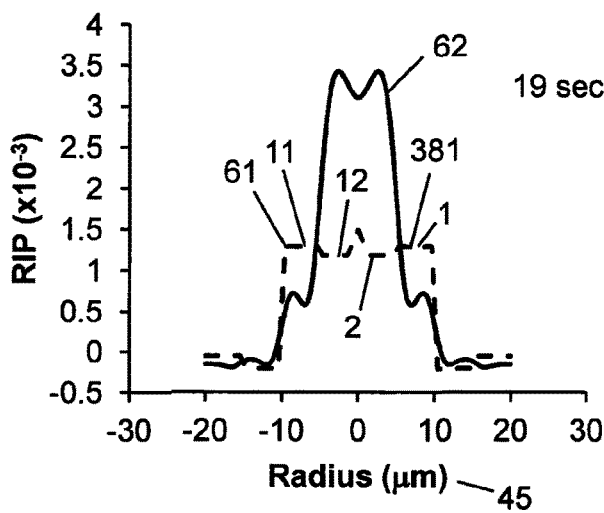

FIG. 40 shows the first refractive index profile before heating 61 and the second refractive index profile 62 after heating. Fluorine has diffused out of the doped region 2 into the outer core 381. The refractive index 12 of the doped region 2 has risen, and the refractive index 11 of the outer core 381 has fallen.

Figure 41:
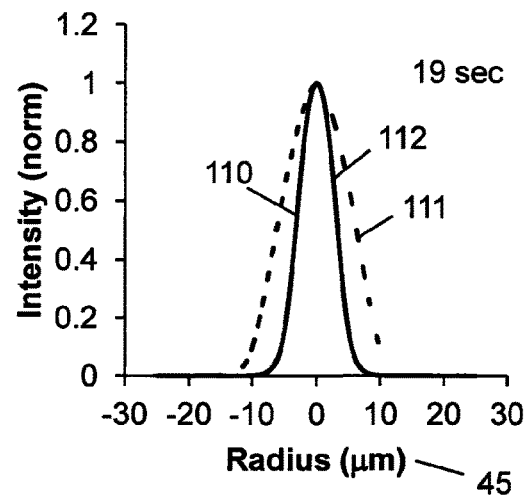

FIG. 41 shows the optical power distribution 111 of the fundamental mode 110 before heating and the optical power distribution 112 of the fundamental mode 110 after heating. The parameters of the fundamental mode 110 before and after heating are given in Table 7, together with the figure-of-merit FoM for this design. The effective mode area of the fundamental mode 110 has reduced from 267 $μm^2$ to 84 $μm^2$. Advantageously, the optical fibre 380 can be used to splice to a second optical fibre that has a mode field diameter that is less than the mode field diameter 115 of the optical fibre 380. The figure-of-merit FoM is in excess of 150 for the fibre of FIG. 38, which is greater than can be obtained from prior art approaches.

TABLE 7

Calculated mode field parameters and FoM values

Figure 42:
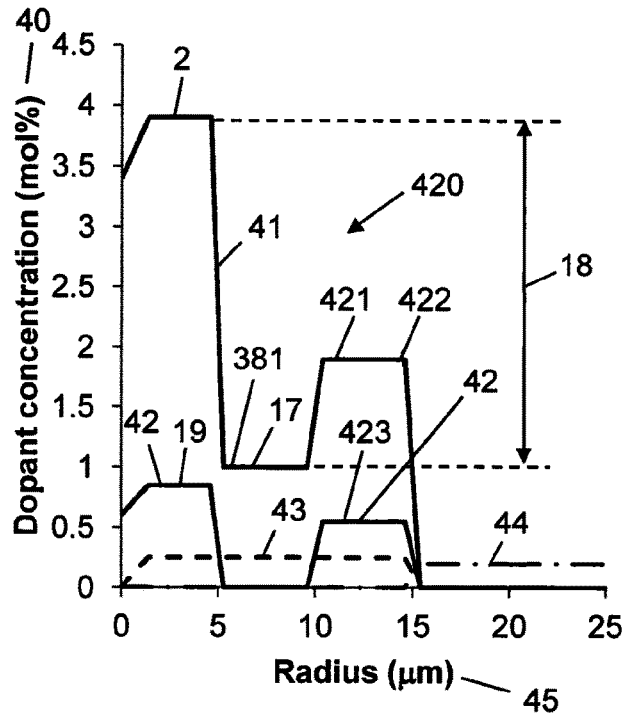
FIGS. 42 to 45 show an example of an optical fibre in which the mode field diameter of the fundamental mode decreases with heating more rapidly than the optical fibre design of FIGS. 38 to 41.

| | Optical fibre of FIG. 38 | | Optical fibre of FIG. 42 | |
|---|---|---|---|---|
| | Pristine | Diffused (19 sec) | Pristine | Diffused (14 sec) |
| Effective mode area ($μm^2$) | 267 | 84 | 265 | 84 |
| Mode field diameter (μm) | 17.9 | 10.7 | 17.7 | 10.7 |
| Beam quality $M^2$ | 1.03 | 1.01 | 1.03 | 1.02 |
| FoM | 158.1 | | 154.1 | |

The optical fibre 380 is an example of a beam delivery fibre for high power lasers which has a large core diameter in order to reduce optical non-linearities such as Raman scattering and four wave mixing. Advantageously, the optical fibre 380 can be spliced with low loss to a smaller core optical fibre such as the optical fibre 23 in FIG. 4 without requiring tapering of the cladding diameter. A further benefit of the optical fibre 380 as a delivery fibre is that a smaller core diameter may be required at the output of a laser to increase the divergence of the output beam and reduce the power density in the processing optics. Heating of the optical fibre 380 at its output can reduce its core diameter.

It should be noted that the optical fibre 380 can be spliced to the optical fibre 50 described with reference to FIG. 5. The core diameter of optical fibre 50 increases when heated. The core diameter of optical fibre 380 becomes smaller when heated. Thus splicing the enlarged core of optical 50 to the reduced core of optical fibre 380 allows an even larger transformation of the mode field diameter within a single splice. Additionally or alternatively, a shorter splice can be made that is more reliable as the transition is shared between the two optical fibres.

Example 7

FIG. 42 shows an optical fibre 420 which is similar to the optical fibre 380 of FIG. 38. The optical fibre 420 includes a second doped region 421 between radii of 10 μm and 15 μm. The fluorine concentration 42 has a dopant concentration 423 of 0.55 mol % and the germanium concentration 41 has a concentration 422 of 1.9 mol % in the second doped region 421. The concealed dopant concentration 18 in the second doped region 421 is the germanium concentration 422, which was selected to balance the refractive index change 146 induced by the mobile dopant 9, fluorine, in the second doped region 421. The concealed dopant concentration 18 in the doped region 2 is the same as for the optical fibre 380 of FIG. 38.

Figure 43:
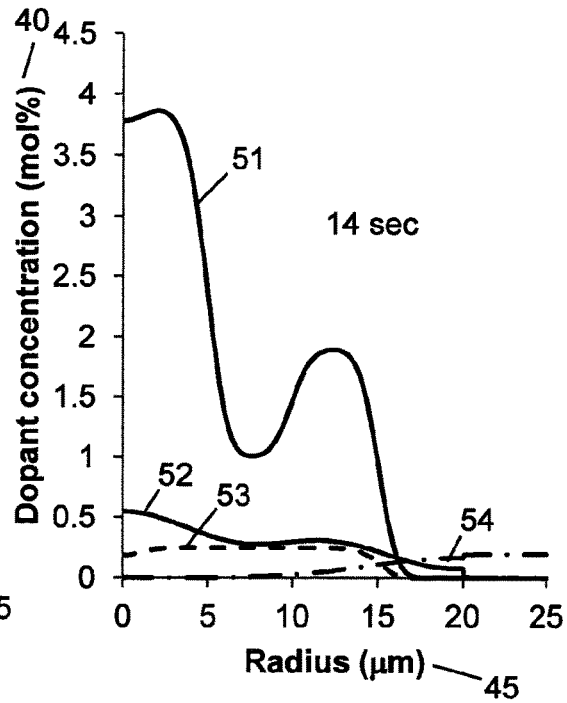

FIG. 43 shows germania, fluorine, phosphorus pentoxide, and chlorine concentrations 51, 52, 53, 54 after heating the fibre 420 for 14 seconds at 2050 C.

Figure 44:
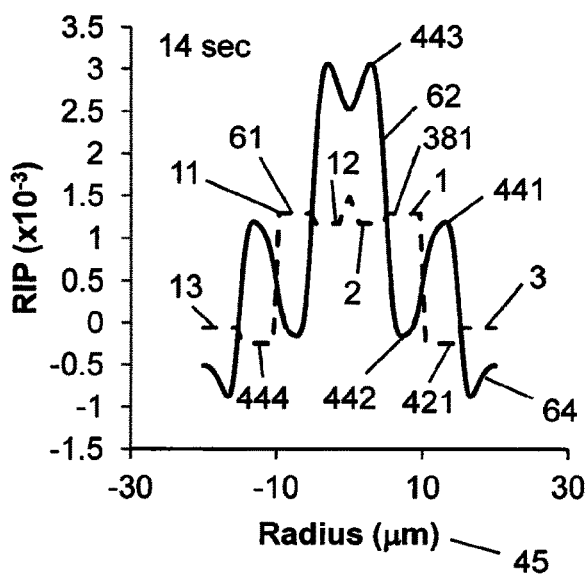

FIG. 44 shows the first refractive index profile 61 before heating and the second refractive index profile 62 after heating. Fluorine has diffused out of the doped regions 2, 421 into the outer core 381. The refractive indices 12, 444 of the doped regions 2, 421 have risen to the refractive indices 443 and 441 respectively. The refractive index 11 of the outer core 381 has fallen to the refractive index 442. The difference between the refractive index 443 and the refractive index 13 of the cladding 3 after heating is approximately twice that of the difference between the refractive index 11 of the core 1 and the refractive index 13 of the cladding 3 before heating.

Figure 45:
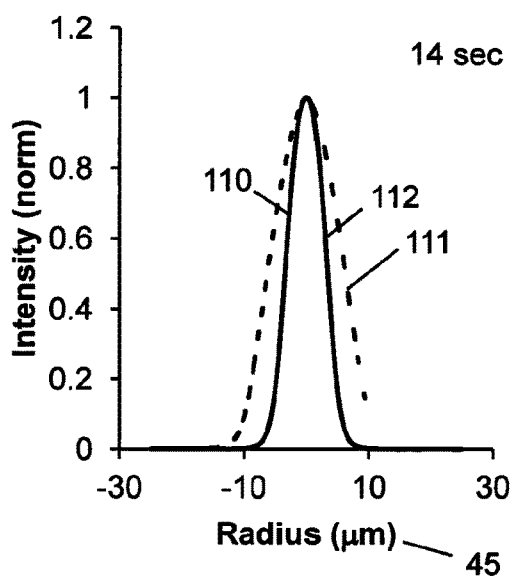

FIG. 45 shows the optical power distribution 111 of the fundamental mode 110 before heating and the optical power distribution 112 of the fundamental mode 110 after heating. The parameters of the fundamental mode 110 before and after heating are given in Table 7, together with the figure of merit (FoM). The effective mode area of the fundamental mode 110 has reduced from 265 μm² to 84 μm². Advantageously, the optical fibre 420 of FIG. 42 provides substantially the same reduction in the fundamental mode area after heating in 14 seconds compared to 19 seconds for the optical fibre 380 of FIG. 38. Reducing the time required to transform the optical mode parameters improves the reliability of optical fibre splices and other optical devices. The advantages discussed with reference to Example 6 apply to this Example.

Example 8

Figure 46:
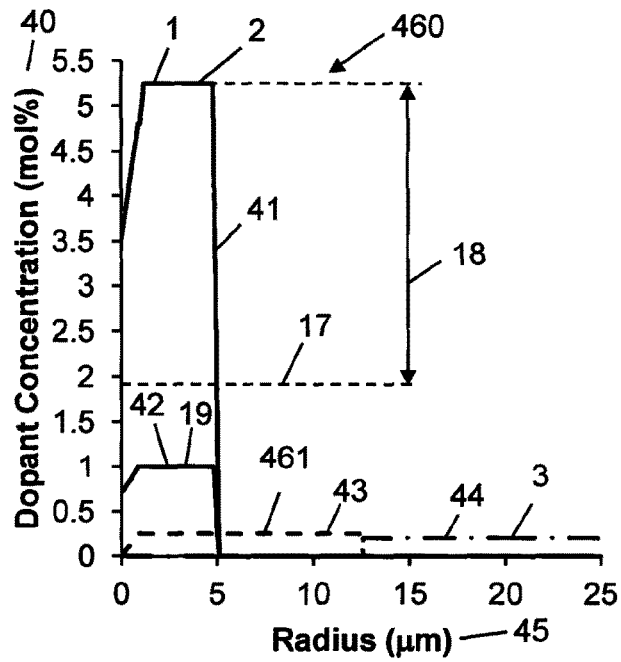
FIGS. 46 to 49 show an example of an optical fibre in which the refractive index of the core increases with heating.

FIG. 46 shows the dopant concentration 40 for an optical fibre 460 which is similar in design to the optical fibre 380 of FIG. 38, save that the core 1 and the doped region 2 of the fibre 460 overlap with each other. The optical fibre 460 is designed to increase the difference between the refractive index 11 of the core 1 and the refractive index 13 of the cladding 3 from 0.0024 to 0.0042 upon heating.

As shown in FIG. 46 and Table 8, the germania concentration 41 and the fluorine concentration 42 in the core 1 are 5.25 mol % and 1 mol % respectively. The cladding 3 comprises an inner cladding 461 doped with phosphorus pentoxide, and an outer cladding 3 that is synthetic silica comprising silica doped with chlorine. The phosphorus pentoxide concentration 43 is selected such that the refractive index 13 of the cladding 3 is approximately uniform. Phosphorus pentoxide is also selected as a dopant as it is believed to increase the diffusion coefficient 16 of fluorine, thereby reducing the time required to make a splice.

TABLE 8

Dopant Concentrations

| Location | Dopant | Chemical Formula | Concentration | Concentration without use of Fluorine | Difference in Concentration |
| --- | --- | --- | --- | --- | --- |
| 0 to 5 μm | Germania | $GeO_2$ | 5.25 mol % | 1.75 mol % | 3.5 mol % |
| 0 to 5 μm | Fluorine | $SiO_{1.5}F$ | 1.00 mol % | 0 mol % | 1.00 mol % |
| 0 to 5 μm | Phosphorus Pentoxide | $P_2O_5$ | 0.25 mol % | 0.25 mol % | 0 mol % |
| 5 to 15 μm | Phosphorus Pentoxide | $P_2O_5$ | 0.25 mol % | 0.25 mol % | 0 mol % |
| >15 μm | Chlorine | $SiO_{1.5}Cl$ | 0.2 mol % | 0.2 mol % | 0 mol % |

Figure 47:
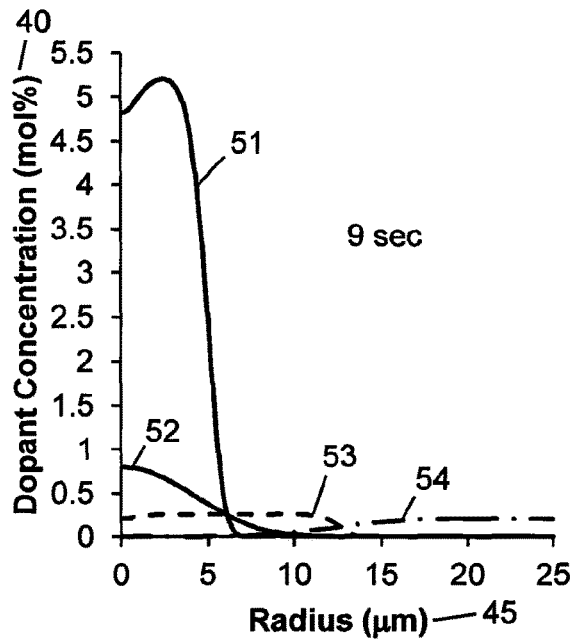

FIG. 47 shows germania, fluorine, phosphorus pentoxide, and chlorine concentrations 51, 52, 53, 54 after heating the fibre for 9 seconds at 2050 C.

Figure 48:
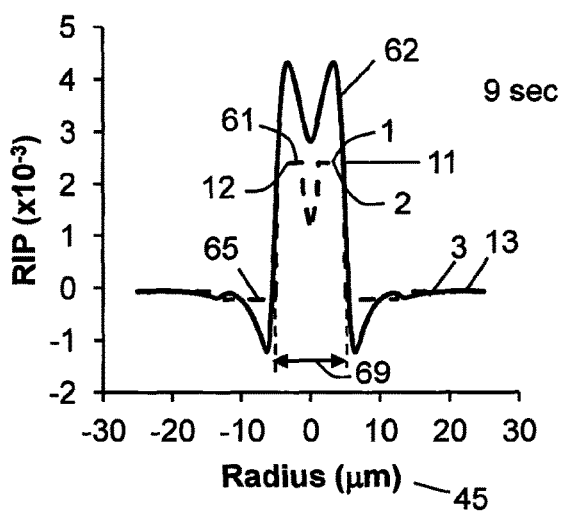

FIG. 48 shows the refractive index 61 before heating and the second refractive index 62 after heating 62. The refractive index 11 of the core 1 is the same as the refractive index 12 of the doped region 2 as the doped region 2 overlaps with the core 1. Fluorine has diffused out of the doped region 2 into the cladding 3. The refractive index 12 of the doped region 2 has risen. The refractive index 11 of the core 1 has also risen as the core 1 overlaps the doped region 2. The difference between the refractive index 11 of the core 1 and the refractive index 13 of the cladding 3 is higher after heating than before heating.

Figure 49:
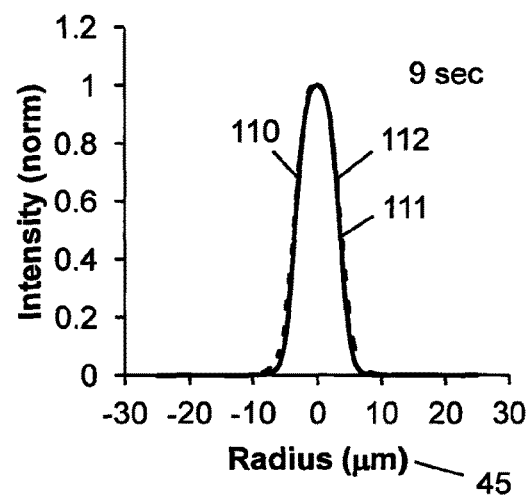

FIG. 49 shows the optical power distribution 111 of the fundamental mode 110 before heating and the optical power distribution 112 of the fundamental mode 110 after heating. The parameters of the fundamental mode 110 before and after heating are given in Table 9, together with the FoM for this design. The reduction in the effective mode area is caused by the increase in the difference between the refractive index 11 of the core 1 and the refractive index 13 of the cladding 3 induced by heating of the optical fibre 460. Advantageously, the increase in the refractive index 11 improves the guidance properties 39 of the optical fibre 460. This can be demonstrated by calculating the pure bend loss in a 40 mm diameter bend. The bend loss calculated for one loop decreases by eight orders of magnitude, from 0.1 dB/loop to $9 \times 10^{-10}$ dB per loop.

TABLE 9

Calculated mode field parameters and FIGURE of merit

| | Optical fibre of FIG. 48 | |
|---|---|---|
| | Pristine | Diffused (19 sec) |
| Effective mode area ($\mu m^2$) | 91 | 72 |
| Mode field diameter ($\mu m$) | 11.1 | 9.4 |
| Beam quality $M^2$ | 1.02 | 1.03 |
| Bend loss in a 40 mm diameter coil (dB per turn) | 0.1 | $9 \times 10^{-10}$ |
| FoM | | 20.3 |

Referring again to FIG. 46, the fluorine concentration 42 of 1 mol % is substantially higher than would be required to produce the first refractive index profile 61 in FIG. 48. Table 8 shows the concentrations for an equivalent fibre having the same first refractive index profile 61 as the optical fibre 460, but without the fluorine dopant. The germania concentration 41 reduces to 1.75 mol %, which is a reduction in concentration by a factor of ⅓ over the concentration of 5.25 mol % used in the optical fibre 460. The concentration 17 of the first dopant 7 in the core 1 is 1.75 mol %. The balancing concentration 18 of the concealed dopant 8 is 3.5 mol %, which is a factor of two higher than the concentration 17. The concentration 19 of the mobile dopant 9 is 1 mol %.

The figure-of-merit FoM of the optical fibre 460 is smaller than in previous examples, and is similar to the best values that we believe are achievable with prior art techniques. Nevertheless, standard fibre designs typically show an increase in bending sensitivity when heated, as thermally expanded cores have lower numerical aperture due to diffusion of the first dopant. The reduced bend sensitivity of fibre 460 upon heating makes this fibre advantageous for the manufacturing of optical components where heat treatment and low microbending losses are required. Feed-through taper-fibre-bundles used for pumping of end-pumped lasers may benefit from the use of optical fibre 460.

The optical fibres in the above examples have substantially uniform doping in the core 1, doped region 2 and the cladding 3. However similar designs can be made using microstructured fibres, such as the optical fibre 500 shown in FIG. 50. Here the doped region 2 comprises longitudinally extending structures 503, 504 that comprise the concealed dopant 8 and the mobile dopant 9 respectively. The longitudinally extending structures 503, 504 can have a diameter 505 in the range 1 μm to 25 μm. The longitudinally extending structures 503, 504 can have separations in the range 1 μm to 50 μm. The refractive index 12 of the doped region 2 is the average refractive index over the cross sectional area of the doped region 2. Microstructure fibres can be advantageous for incorporating dopants at concentrations that are difficult to achieve using chemical vapour deposition. The core 1 can also be microstructured.

Figure 50:
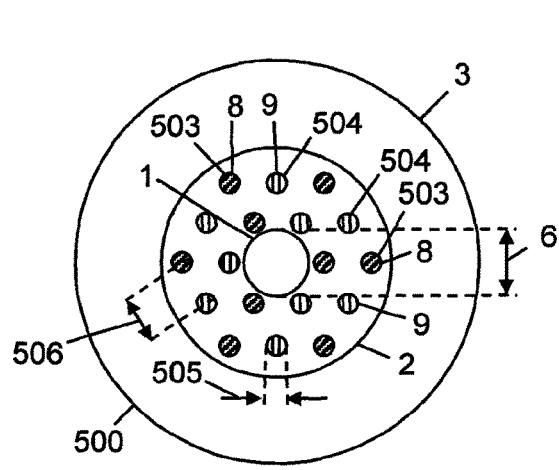
FIG. 50 shows a microstructured optical fibre according to the present invention.

The optical fibre 10 shown in FIG. 1 can be the optical fibre 50 of FIG. 5, the optical fibre 180 of FIG. 18, the optical fibre 220 of FIG. 22, the optical fibre 320 of FIG. 32, the optical fibre 380 of FIG. 38, the optical fibre 420 of FIG. 42, the optical fibre 460 of FIG. 46, or the optical fibre 500 of FIG. 50. The dopant concentrations and dimensions of the fibres of the Examples can be changed. Alternative and additional dopants, such as alumina and rare earth dopants, can also be added.

The modal behaviour of the optical fibre 10 is defined at the operating wavelength 36. The optical fibre 10 may be a singlemode optical fibre prior to heating, and a multimode optical fibre after heating. The operating wavelength 36 may be in the visible or near infrared spectrum. The wavelength 36 may be in the range 1000 nm to 1100 nm, 1300 nm to 1350 nm, 1500 nm to 1600 nm, or 1900 nm to 2500 nm. Ytterbium doped fibre lasers operate in the wavelength range 1000 nm to 1100 nm.

Referring again to FIG. 1, the optical fibre 10 may be such that heating increases the mode field diameter 115. The optical fibre 10 may be a single mode optical fibre prior to heating, and a multimode optical fibre after heating. Alternatively, the optical fibre 10 may be a multimode optical fibre prior to heating, and a multimode optical fibre that supports more guided modes after heating. Such a fibre would be described as more multimoded. High power fibre lasers often use multimode active fibres as the gain medium, which fibre lasers are configured to provide a substantially fundamental mode output. Controlled coupling with low loss and high modal purity from the optical fibre 10 at the output of a fibre laser into a multimode delivery fibre can allow single mode propagation through the multimode delivery fibre. The multimode delivery fibre generally has a larger core diameter than the output fibre from the fibre laser. Use of the multimode delivery fibre for delivering the single mode output from the fibre laser can reduce or avoid the effects of stimulated Raman scattering and other non-linear optical effects. This is especially important for power levels greater than 1 kW, 2 kW, or 10 kW, and more important for pulsed lasers having peak powers greater than 10 kW. The advantages increase as the length of the multimode delivery fibre increases as the onset of non-linear optical behaviour is power and length dependent.

The mode field diameter 116 after heating may be at least 1.5 times greater than the mode field diameter 115 before heating.

The optical fibre 10 may be such that prior to heating, the refractive index 12 of the doped region 2 is equal to the refractive index 13 of the cladding 3. This enables splicing of the optical fibre 10 to a conventional step index type fibre.

The optical fibre 10 may be such that prior to heating, the refractive index 12 of the doped region 2 is greater than the refractive index 13 of the cladding 3. The optical fibre 22 described in Example 1 had a pedestal 82. The pedestal 82 is a cladding that has a refractive index 86 larger than the refractive index 13 of the outer cladding 3, but less than the refractive index 11 of the core 1. In general, the core 1 can waveguide against the pedestal 82. Pedestals have the advantage of reducing failures in pulsed lasers arising from power leaking from the core of active fibres because power that leaks from the core into the pedestal can be guided by the pedestal and routed away from pump diodes. Pedestals are also used in the design of certain non-photodarkening fibres.

The optical fibre 10 may be such that prior to heating, the refractive index 12 of the doped region 2 is less than the refractive index 13 of the cladding 3. This is advantageous when splicing to fibres with depressed inner claddings, such as so-called "W-fibres". Depressed cladding fibres allow larger mode field diameters in the optical fibre while retaining single mode operation.

The dopant 7 in the core 1 may be germania. The core 1 may also comprise phosphorus pentoxide.

The dopant 7 may be phosphorus pentoxide.

The concealed dopant 8 in the doped region 2 may be germania. The doped region 2 may also comprise phosphorus pentoxide.

The concealed dopant 8 may be phosphorus pentoxide.

The mobile dopant 9 having the concentration 18 may be fluorine. The concentration 18 of fluorine in the doped region 2 may be greater than 0.1 mol %, preferably greater than 0.25 mol %, and more preferably greater than 0.5 mol %. The concentration 18 may be at least 1 mol %. Such levels of fluorine concentration are not commonly used in optical fibres.

The dopant 7 may comprise a rare earth dopant.

The first core diameter 6 may be in the range 5 μm to 50 μm, preferably in the range 10 μm to 30 μm, and more preferably in the range 10 μm to 25 μm.

The optical fibre 10 may have more than one doped region 2 comprising the concealed dopant 8 and the mobile dopant 9. At least one of the doped regions 2 may be in the core 1. At least one of the doped regions 2 may be outside of the core 1.

The optical fibre 10 may comprise a pedestal 181, such as shown with reference to FIG. 18.

Figure 51:
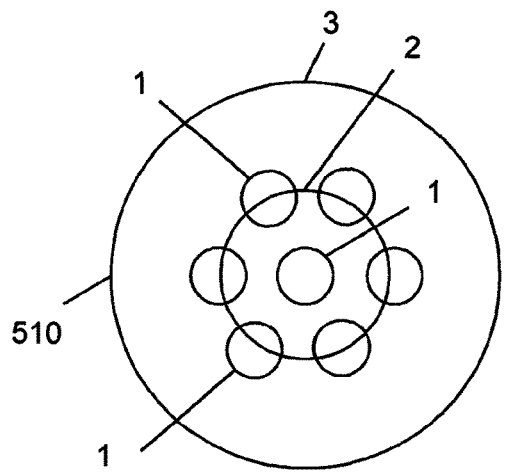
FIG. 51 shows a multicore optical fibre according to the present invention.

The optical fibre 10 can comprise a plurality of cores 1 such as the optical fibre 510 shown with reference to FIG. 51. The doped region 2 is shown overlapping the core 1 in the centre of the fibre 510 and extending to regions between the cores 1. Heating of the optical fibre 510 can result in controlled optical coupling between different ones of the cores 1.

Figure 52:
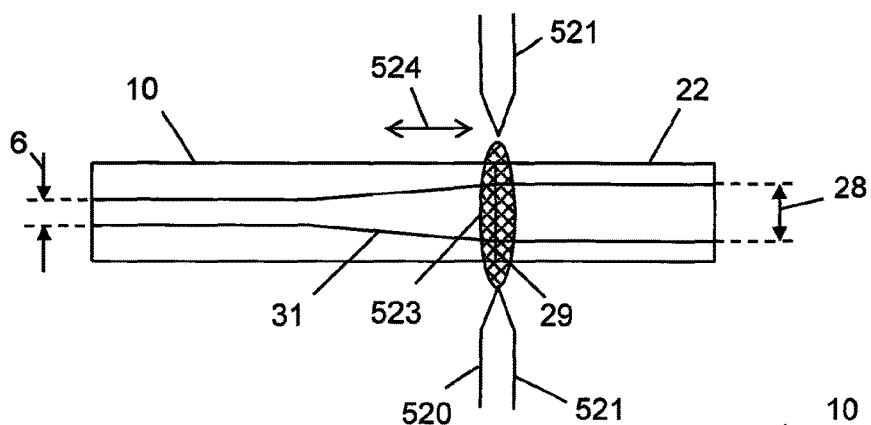
FIG. 52 shows a splice being made with a fusion splicer.

FIG. 52 shows the splice 29 of FIG. 4 being made with a fusion splicer 520. The fusion splicer 520 has two electrodes 521 which provide a plasma 523 for splicing the fibres. The relative speed 524 that the plasma 523 is moved with respect to the optical fibre 10 can be varied in order to vary the heat energy input into the splice 29. Alternatively or additionally, the temperature of the plasma 523 can be varied while making the splice 29. In this way, tapers 31 and other optical devices that comprise the optical fibre 10 can be fabricated. Fusion splicers based on $CO_2$ lasers, flames, or other heat sources can also be used. An example of a fusion splicer that can be used to make the splice 29 is model number S184 supplied by Fitel of Norcross, Ga., United States of America.

The optical fibre 10 may be such that the core diameter 6 increases during the splicing process. This enables the optical fibre 10 to be spliced to the second optical fibre 22 having a larger core diameter 28 as shown. The optical fibre 10 can be the optical fibre 380 of FIG. 38 or the optical fibre 420 of FIG. 42. Alternatively, the optical fibre 10 may be such that the diameter 6 decreases during the splicing process. This enables the optical fibre 10 to be spliced to optical fibres in which the diameter 28 is smaller than the diameter 6. The optical fibre 10 can be the optical fibre 380 of FIG. 38 or the optical fibre 420 of FIG. 42.

The splice 29 of FIG. 4 can be made between a first optical fibre 10 which core diameter 6 increases during the splicing process, and a second optical fibre 22 which core diameter 28 decreases during the splicing process. The optical fibre 10 can be the optical fibre 380 of FIG. 38 or the optical fibre 420 of FIG. 42. The optical fibre 22 can be the optical fibre 380 of FIG. 38 or the optical fibre 420 of FIG. 42. This enables the optical fibre 10 to be spliced to optical fibres in which the diameter 28 is larger than the diameter 6. Additionally or alternatively, a shorter splice can be made that is more reliable as the transition is shared between the two optical fibres. Additionally or alternatively, a lower concentration 146 of the mobile dopant 9 can be used for the optical fibre 10 and the optical fibre 22. This makes the fabrication of the optical fibre 10 and the optical fibre 22 easier and more reliable.

Figure 67:
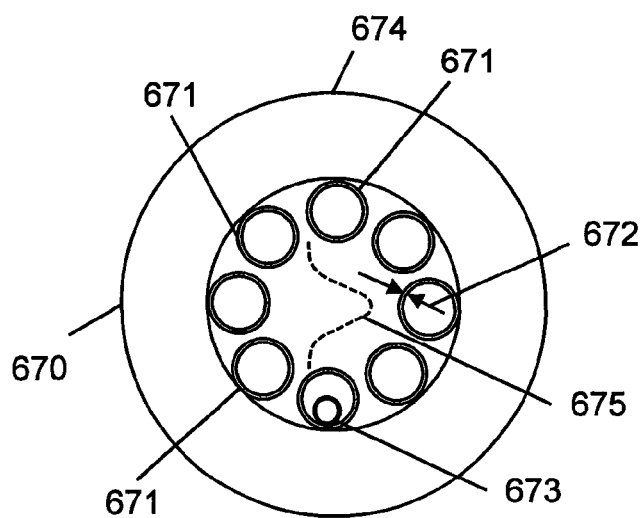
FIG. 67 shows a hollow core anti-resonant optical fibre.

The splice 29 of FIG. 4 can be made between a first optical fibre 10 which core diameter 6 increases during the splicing process, and a second optical fibre 22. The second optical fibre 22 can be a microstructured optical fibre such as a photonic bandgap fibre, a Kagome fibre, or a hollow core anti-resonant optical fibre. An example of the latter is shown in FIG. 67. The hollow core anti-resonant optical fibre 670 comprises a cladding 674 and a plurality of capillaries 671 that are attached to the cladding 674. The cladding 674 and the capillaries 671 can be made of fused silica or synthetic silica. The capillaries 671 have a wall thickness 672 less than 100 nanometers, and preferably less than 50 nanometers. The fundamental mode 675 of the optical fibre 670 is mostly guided in the air region between the capillaries 671. The capillaries 671 can be touching each other, or can be separated from each other as shown in FIG. 67. The hollow core anti-resonant optical fibre 670 can present further features such as nested capillaries 673 to further improve the guidance properties. Such optical fibres are beneficial as they have low optical non-linearities and are thus suited for optical beam delivery systems for transmitting high power laser radiation. A first optical fibre 10 designed according to the present invention can be beneficial in reducing the splice losses and decreasing the reflection at the splice by ensuring the fundamental mode 110 of the optical fibre 10 after heating is spatially matched to the fundamental mode 675 of the optical fibre 670.

Figure 53:
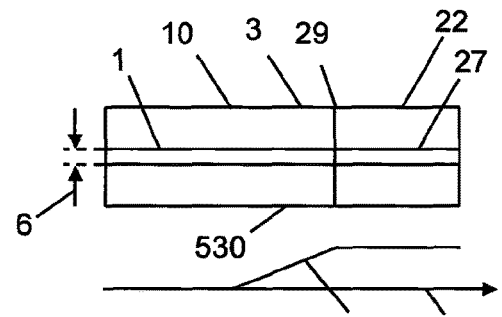
FIGS. 53 and 54 show a splice and a taper in which the refractive index of the core of the optical fibre increases along its length.

FIG. 53 shows a splice 530 in which the optical fibre 10 is such that the difference 531 between the refractive index 11 of the core 1 and the refractive index 13 of the cladding 3 increases along the length 532 of the splice 530 during the splicing process. The core diameter 6 remains substantially uniform along the splice 530. The optical fibre 10 can be the optical fibre 460 of FIG. 46.

Figure 54:
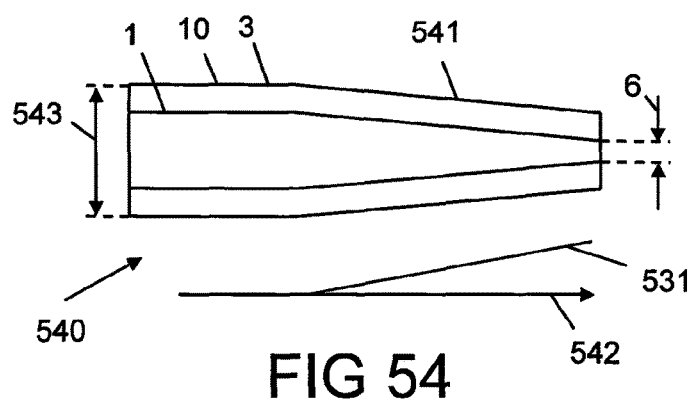

FIG. 54 shows an optical device 540 in which the outside diameter 543 of the optical fibre 10 is tapered along its length 542 in order to form a taper 541. Such a taper can be formed in a fusion splicer such as described with reference to FIG. 52.

Advantageously, the optical fibre 10 can be such that the difference 531 between the refractive index 11 of the core 1 and the refractive index 13 of the cladding 3 increases along the length 542 of the taper 541 in order to improve the optical guidance properties 39 of the optical fibre 10. The optical fibre 10 can be the optical fibre 460 of FIG. 46.

Figure 55:
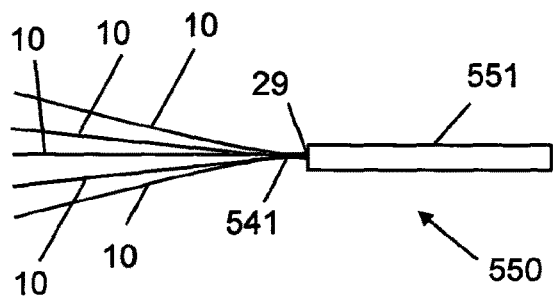
FIGS. 55 and 56 show a signal combiner and a signal feedthrough combiner according to the present invention.

FIG. 55 shows a signal combiner 550 comprising a plurality of the optical fibres 10 which are arranged side by side, fused, tapered together, and spliced to an optical fibre 551. Signal combiners are used to combine laser radiation together from multiple lasers and to output the laser radiation in an optical fibre or a free-space laser signal. The optical fibre 551 is preferably a multimode optical fibre. The optical fibre 10 can have a core 1 with a core diameter 6 which increases with heating to provide a larger core diameter 6 at the splice 29. Examples of such fibres are the optical fibre 50 of FIG. 5, and the optical fibre 220 of FIG. 22. Increasing the size of the core diameter 6 while tapering the fibre 10 can improve the beam quality of the combined laser radiation emitted by the signal combiner 550. Alternatively the optical fibre 10 can have a core 1 with a difference 531 between the refractive index 11 of the core 1 and the refractive index 13 of the cladding 3 that increases with heating as described with reference to FIGS. 53 and 54. Examples of such fibres are the optical fibre 380 of FIG. 38, the optical fibre 420 of FIG. 42, and the optical fibre 460 of FIG. 46. It is found that use of an optical fibre whose difference 531 between the refractive index 11 of the core 1 and the refractive index 13 of the cladding 3 increases along the length 542 of the taper 541 can reduce splice losses in the signal combiner 550, possibly owing to the increased guidance 39 afforded by the increased difference 531.

Figure 56:
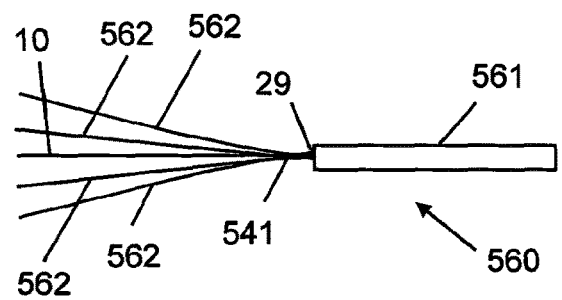

FIG. 56 shows a signal feed-through combiner 560 comprising an optical fibre 10 and a plurality of optical fibres 562 spliced to an optical fibre 561. The optical fibre 561 can be a rare-earth doped amplifying fibre. The optical fibres 562 can be pure silica or large core optical fibres. The pure silica or large core optical fibres can be used for guiding optical pump radiation for pumping a laser such as a fibre laser. The fibre 10 is a signal fibre for guiding laser radiation such as emitted by a fibre laser. The optical fibre 10 can have a core 1 with a core diameter 6 which increases with heating to provide a larger core diameter 6 at the splice 29. Examples of such fibres are the optical fibre 50 of FIG. 5, and the optical fibre 220 of FIG. 22. Increasing the size of the core diameter 6 while tapering the fibre 10 can reduce coupling losses when splicing to a larger diameter fibre. Alternatively or additionally the optical fibre 10 can have a core 1 with a numerical aperture 531 that increases with heating. Examples of such fibres are the optical fibre 380 of FIG. 38, the optical fibre 420 of FIG. 42, and the optical fibre 460 of FIG. 46. Signal feedthrough combiners often experience losses due to the signal fibre being tapered or bent. This is particularly the case for signal fibres having numerical apertures of 0.08 or less. The problem becomes more severe for numerical apertures of 0.07 or less. It is found that use of an optical fibre whose numerical aperture 531 is at least 0.07 and which numerical aperture increases along the length 542 of the taper 541 can reduce splice losses in the signal feedthrough combiner 560, possibly owing to the increased guidance afforded by the increased numerical aperture 531.

Figure 57:
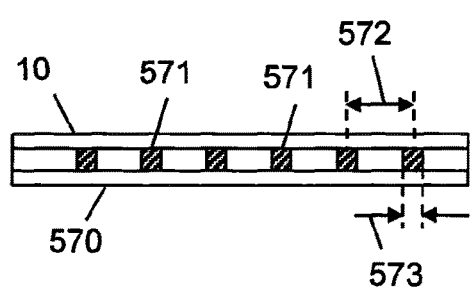
FIGS. 57 to 59 show optical filters according to the present invention.

FIG. 57 shows an optical filter 570 for filtering optical radiation. The optical filter 570 comprises regions 571 in which the first refractive index profile 6 of the optical fibre 10 has been modified by heating. The modification can be performed in a fusion splicer such as described with reference to FIG. 52. At least one of the core diameter 6 or the numerical aperture 531 can be modified by controlled heating. The length 573 of the regions 571 can be in the range 100 μm to 2 mm. The separation 572 of the regions 571 can be in the range 100 μm to 5 mm. The optical fibre 10 can be one of those described in the Examples. The optical filter 570 can have regions 571 which are azimuthally symmetric, as shown in FIG. 57. Alternatively the regions 571 may be azimuthally asymmetric as shown in the optical device 580 shown with reference to FIG. 58. Asymmetry can be designed into the optical device 580 by varying the relative position of the plasma 523 and the optical fibre 10 while applying heat in a fusion splicer such as described with reference to FIG. 52.

Figure 59:
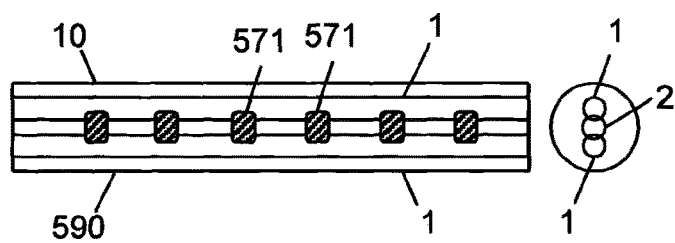

FIG. 59 shows an optical filter 590 comprising an optical fibre 10 having two cores 1 and a doped region 2 at least partly between the two cores 1. Controlled heating in a fusion splicer enables the regions 571 to be created in the doped region 2. The regions 571 are configured such that optical radiation at specific wavelengths can be coupled between the cores 1. Such an optical filter 590 can be used for the controlled removal of wavelength shifted light caused by stimulated Raman or Brillouin scattering in laser systems.

Figure 60:
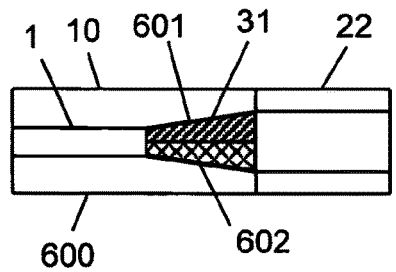
FIG. 60 shows a splice according to the present invention having an azimuthally asymmetric second refractive index profile.

FIG. 60 shows a splice 600 in which the taper 31 is formed by asymmetric heating of the optical fibre 10 in the fusion splicer. The taper 31 has a first region 601 in which the mobile dopant 9 has diffused differently than in a second region 602. Such a splice 600 can be used to couple a fundamental mode to one or more odd-numbered optical modes in the optical fibre 22. Advantageously, the splice 600 can be used to convert the laser radiation from a substantially single mode laser having a beam quality $M^2$ factor between 1 and 1.6 to the low-order modes of a multimode optical fibre. The optical fibre 22 can be a multimode optical fibre, and the modes launched in the splice 600 can result in laser radiation having a beam quality $M^2$ factor in the range 2 to 10, preferably in the range 2 to 7, and more preferably in the range 2 to 4. Such coupling is difficult to achieve reliably and quickly with prior art methods.

Figure 61:
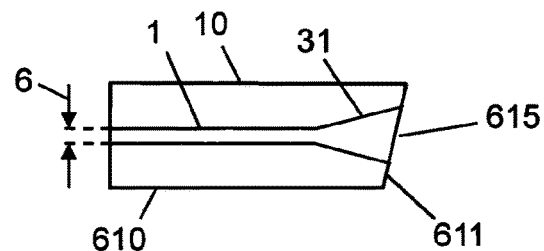
FIG. 61 shows a beam delivery fibre according to the present invention in which the core diameter increases towards an angled cleave.

FIG. 61 shows an optical device 610 comprising a fibre 10 in which the taper 31 made in a fusion splicer has increased the core diameter 6 at an output end 615 of the fibre 10 from which laser radiation can be emitted. The optical device 610 has an angled facet 611 to reduce back reflections. Angled facets can be made with optical fibre cleavers. Expanding the core diameter 6 generally increases the mode diameter of laser radiation propagating along the fibre 10, and thus reduces the risk of facet damage. Advantageously, the design avoids the use of end caps that are fusion spliced to optical fibres in high power laser beam delivery cables. The fibre 10 can be the fibre 50 described with reference to FIGS. 5 to 9.

Figure 62:
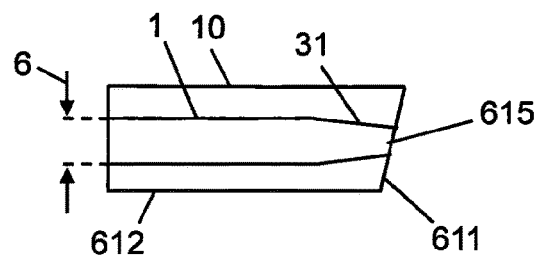
FIG. 62 shows a beam delivery fibre according to the present invention in which the core diameter decreases towards an angled cleave.

FIG. 62 shows an optical device 612 comprising a fibre 10 in which the taper 31 made in a fusion splicer has decreased the core diameter 6. Decreasing the core diameter 6 generally decreases the mode field diameter of laser radiation propagating along the fibre 10, and thus increases the divergence of the light propagating from the facet. A laser radiation being emitted with very low divergence results in a small spot size onto the focussing optics, with increased intensity and increase risk of thermal lensing, aberrations, and optical damage in the processing optics used at the output of a high power laser. Advantageously, the design reduces these risks in high power laser beam delivery cables, while a large core diameter 6 can reduce or avoid the effects of stimulated Raman scattering and other non-linear optical effects. The fibre 10 can be the fibre 380 or 420 described with reference to FIGS. 38 to 45.

Figure 63:
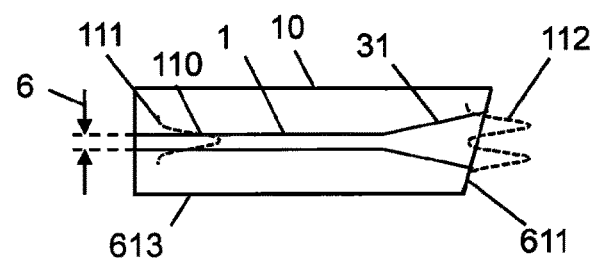
FIG. 63 shows a beam delivery fibre according to the present invention in which the mode shape is changed as the mode propagates towards an angled cleave.

FIG. 63 shows an optical device 613 comprising a fibre 10 in which the taper 31 causes the optical power distribution 111 of the mode 110 to change to the optical power distribution 112 as the mode 110 propagates along the optical fibre. The optical fibre 10 can be the optical fibre 220, whose refractive index profile 62 can be varied by as described with reference to FIGS. 26 to 31. The optical power distribution 110 can be Gaussian. The optical power distribution 112 can be triangular, top hat (that is flat topped) or doughnut as shown in FIGS. 29, 30 and 31 respectively. Being able to optimise the optical power distribution 112 for a particular application such as cutting or welding by heating the optical fibre 10 inside a high power laser beam delivery cable is a particularly advantageous aspect of the present invention.

The angled cleaves 611 shown in FIGS. 61 to 63 can be replaced by end caps. The ability to modify the optical power distribution 110 is advantageous for optimising the optical power distribution of laser radiation that is focussed on or near a work piece. Thus for example, cutting processes can be optimized by having a top hat, doughnut optical power distributions on or near the work piece. Piercing of metals is generally optimized by having a Gaussian or triangular optical power distribution.

The optical fibre 10 of FIGS. 57, 58, 60 and 61 can be the optical fibre 50 of FIG. 5, the optical fibre 220 of FIG. 22, the optical fibre 380 of FIG. 38, the optical fibre 420 of FIG. 42, and the optical fibre 460 of FIG. 46. Other designs of the optical fibre 10 are also possible.

Figure 64:
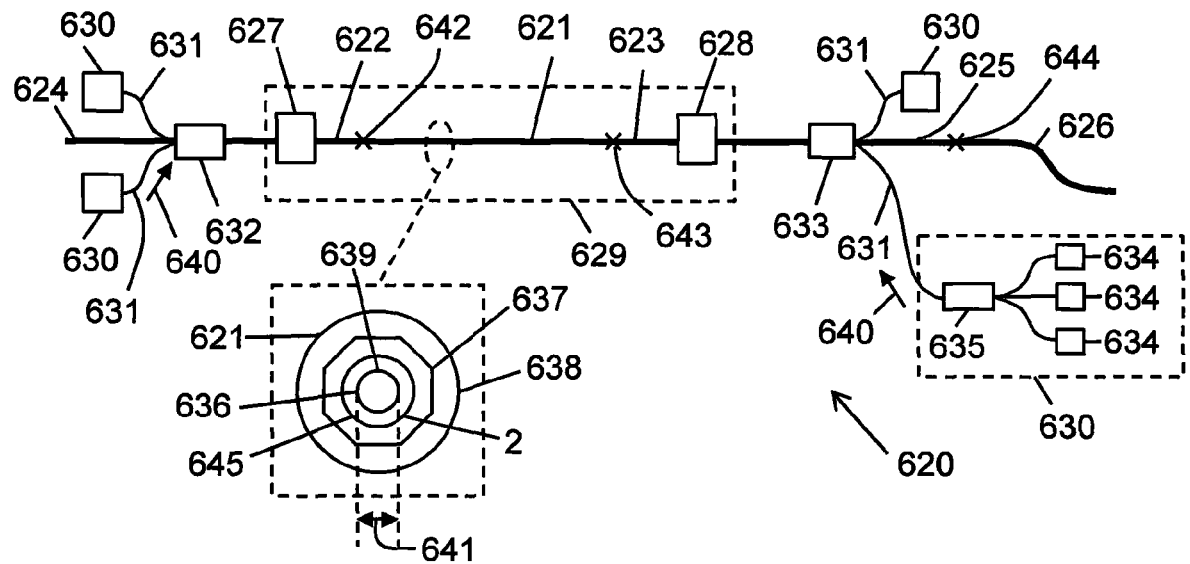
FIGS. 64 to 66 show laser configurations according to the present invention.

The optical fibre 10 and the optical devices of FIGS. 53 to 61 can be used in a variety of lasers. FIG. 64 shows an end-pumped fibre laser 620 comprising an amplifying fibre 621, optical fibres 622 and 623 spliced at either end of the amplifying fibre 621, an input fibre 624, an output fibre 625, and a beam delivery fibre 626. Optical fibre Bragg gratings 627, 628 are located at either end of the amplifying fibre 621 to form a laser cavity 629. The optical fibre Bragg gratings 627 and 628 are shown in the optical fibres 622 and 623. Alternatively, the optical fibre Bragg grating 627 may be in the amplifying fibre 621 or the input fibre 624. The optical fibre Bragg grating 627 may be in the amplifying fibre 621 or the fibre 625. Pump sources 630 are coupled into the amplifying fibre 621 via optical fibres 631 and signal feedthrough combiners 632, 633. The signal feedthrough combiners 632, 633 can be the signal feedthrough combiner 560 shown with reference to FIG. 56. The pump sources 630 can comprise laser diodes, laser diode modules comprising a plurality of laser diodes, or laser diode bars. The pump sources 630 can comprise one or more fibre lasers. The pump sources 630 can comprise a plurality of pump sources 634 whose outputs are combined together with a pump combiner 635. The pump sources 634 can be individual laser diodes, laser diode modules each comprising a plurality of laser diodes, laser diode bars, or fibre lasers. The pump combiner 635 can be the pump combiner 550 shown with respect to FIG. 55. The amplifying fibre 621 is preferably a double clad fibre comprising a core 636, an inner cladding 637, and an outer cladding 638. The core 636 can be doped with rare earth dopant 639. The inner cladding 637 can be circular or non-circular as shown. Non-circular inner claddings assist with coupling of pump radiation from the inner cladding 637 into the core 636 and can therefore assist with pump absorption. The outer cladding 638 has a refractive index less than a refractive index of the inner cladding 637 in order to guide the pump radiation 640 from the pump sources 630. The core 636 has a core diameter 641. The amplifying fibre 621 may have a pedestal 645 having a refractive index that is larger than the refractive index of the inner cladding 637 and smaller than the refractive index of the core 1. The amplifying fibre 621 may have a doped region 2 and be an example of the optical fibre 10 of FIG. 1. The fibres 622, 621, 623, and 626 are spliced with splices 642, 643 and 644.

Figure 65:
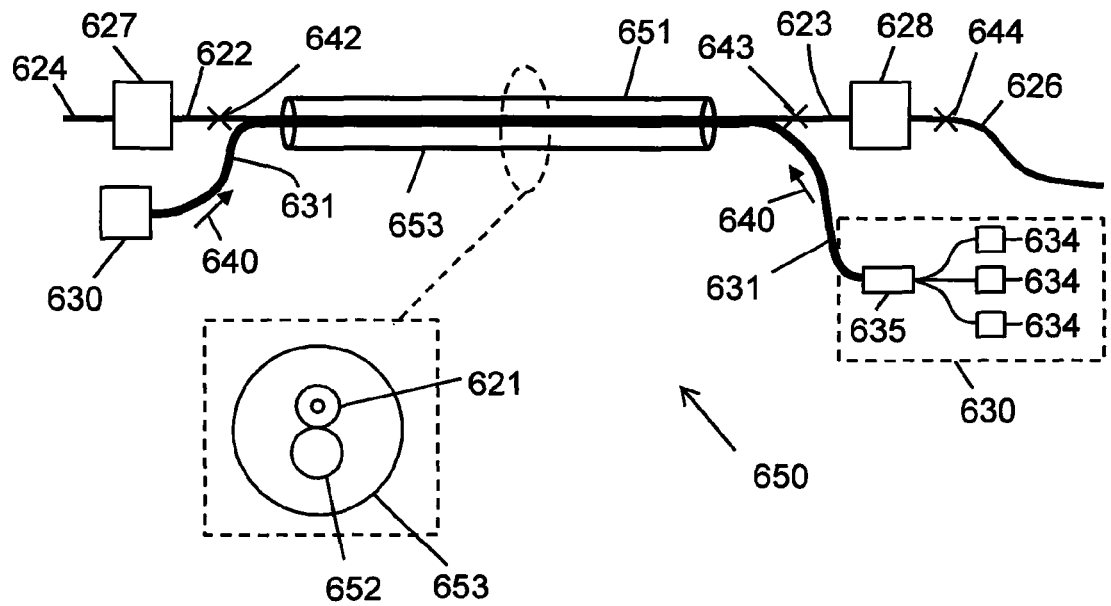

FIG. 65 shows an equivalent side-pumped laser 650 to the end pumped laser 620 of FIG. 64. A composite amplifying optical fibre 651 comprises the amplifying fibre 621 and a pump fibre 652 in a common coating 653. The pump radiation 640 from at least one pump source 630 is coupled into the pump fibre 652 via the optical fibre 631. The amplifying fibre 621 and the pump fibre 652 are in optical contact along at least a portion of their lengths. The pump optical fibre 652 can be drawn from silica rod during the manufacture of the composite amplifying optical fibre 651. The pump optical fibre 652 can be circular as shown, or can be non-circular. Non circular pump optical fibres are advantageous for increasing the coupling between the pump radiation 640 guided along the pump fibre 652 and the amplifying fibre 621. The common coating 653 has a refractive index that is less than both the refractive index of the amplifying fibre 621 and the refractive index of the pump optical fibre 652.

Figure 66:
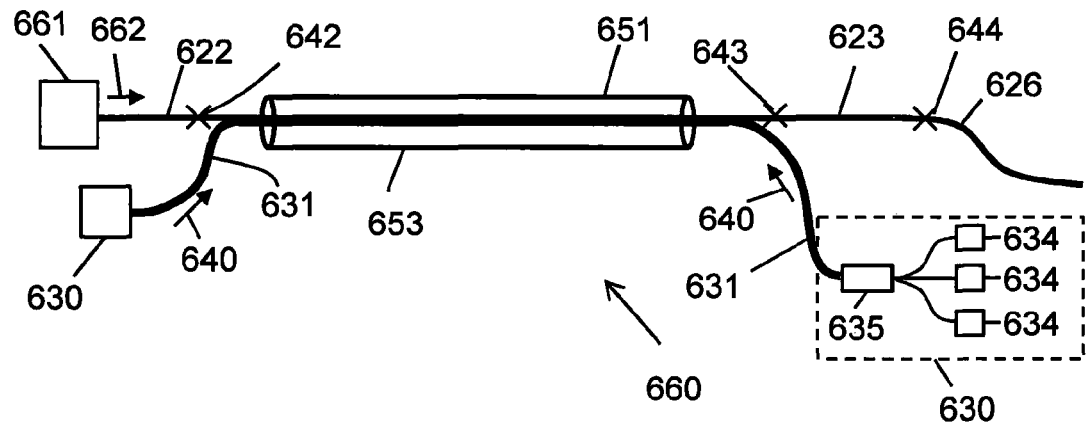

FIG. 66 shows a laser 660 in the form of a master oscillator power amplifier. Laser radiation 662 emitted by a seed laser 661 is amplified by the side-pumped composite amplifying fibre 651, and output via the beam delivery fibre 626. As described with reference to FIG. 65, the composite amplifying fibre 651 comprises the amplifying optical fibre 621. End pumped master oscillator power amplifier configurations similar to FIG. 64 are also possible.

Referring to the lasers 620, 650 and 660 shown with reference to FIGS. 64 to 66, at least one of the optical fibres 621, 622, 623, 624, 625 and 626 may be examples of the optical fibre 10.

The optical fibre 622 may be an example of the optical fibre 10 that has a first core diameter 6 that increases when heated. Examples of such a fibre were optical fibre 50 of FIG. 5, and optical fibre 220 of FIG. 22. The first core diameter 6 prior to heating may be in the range 10 µm to 50 µm.

The amplifying fibre 621 may be a rare earth doped fibre that does not have a doped region 2 and is therefore not an example of the optical fibre 10. With reference to FIG. 4, the amplifying fibre 621 can have a core diameter 28 that is at least 5 µm greater than the first core diameter 6 of the optical fibre 622. Referring to FIGS. 29 to 31, the splice 642 can be made with the fusion splicer 520 at a temperature and a time that achieves the desired spice loss and output power distribution 112 from the optical fibre 622. Thus for example, if it were desired to launch the fundamental mode of the amplifying fibre 621, then an optical power distribution similar to the optical power distribution 112 of FIG. 29 may be desirable. If it were desired to launch low order modes, then the optical power distribution similar to the optical power distribution 112 of FIG. 30 may be desirable.

The amplifying fibre 621 may be an example of the optical fibre 10 that has a first core diameter 6 that decreases when heated. The amplifying fibre 621 may have a first core diameter 6 that is at least 5 µm greater than the first core diameter 6 of the optical fibre 622.

The amplifying fibre 621 may be such that its first core diameter 6 decreases when heated, and the optical fibre 622 may be such that its first core diameter 6 increases when heated. The difference in their first core diameters 6 prior to heating may be greater than 10 µm. The difference may be greater than 40 µm.

The fibre 623 may be an example of the optical fibre 10 that has a first core diameter 6 that increases when heated.

The fibres 622 and 623 may be single mode fibres prior to heating, and multimode fibres after heating.

The fibre 625 in FIG. 64 and the fibre 623 in FIGS. 65 and 66 may be an example of the optical fibre 10 that has a first core diameter 6 that increases when heated. Examples of such a fibre were optical fibre 50 of FIG. 5, and optical fibre 220 of FIG. 22. The first core diameter 6 prior to heating may be in the range 10 µm to 50 µm. Heat may be applied during the splicing process such that the optical power distribution 112 at the splice 644 is substantially Gaussian, as shown in FIG. 29. The optical power distribution 112 may be substantially top hat, as shown in FIG. 30. The optical power distribution 112 may be substantially doughnut mode, as shown in FIG. 31.

At least one of the splices 642, 643 and 644 may be an asymmetric splice. An asymmetric splice was described with reference to FIG. 60. An asymmetric splice can be advantageously used for mode conversion. For example, at least one of the splices 642 and 644 in the laser 660 of FIG. 66 can be used to convert a single mode input having a beam quality $M^2<1.6$ to a low-ordered mode output having a beam quality $M^2$ between 2 and 6.

Referring again to FIGS. 64 to 66, the optical fibre 626 may terminate with an angled cleave such as described with reference to FIGS. 61 to 63. Angled cleaves with a first core diameter 6 that increases with heat can obviate the need for an end cap.

Figure 58:

At least one of the optical fibres 621, 623, 625 and 626 may comprise at least one filter 570, 580 or 590 as described with reference to FIGS. 57 to 59.

Preferably, the splices 642, 643 and 644 are adiabatic in order to reduce splice losses and coupling to higher order modes.

The invention described with reference to the Figures and the Examples can be used in a variety of ways, including optical mode transformers, optical mode converters, optical mode scramblers, optical wavelength filters, long period gratings, optical signal combiners and couplers, multi-core optical fibre couplers, and output beam delivery cables, all of which can be made by a method which includes the step of controlled heating of the optical fibre.

It is to be appreciated that the embodiments of the invention described above with reference to the accompanying drawings have been given by way of example only and that modifications and additional steps and components may be provided to enhance performance. Individual components shown in the drawings are not limited to use in their drawings and may be used in other drawings and in all aspects of the invention. The present invention extends to the above mentioned features taken singly or in any combination.

The invention claimed is:

1. An optical fibre which has a first refractive index profile that is changeable by heating to a second refractive index profile, the optical fibre comprising at least one core, a cladding, at least one first dopant for providing the first refractive index profile, at least one concealed dopant, and at least one mobile dopant, wherein:
   the first refractive index profile has a first optical guidance property;
   the second refractive index profile has a second optical guidance property;
   the first optical guidance property is different from the second optical guidance property;
   the core has a refractive index that is greater than a refractive index of the cladding;
   the concealed dopant is the same as or different from the first dopant;
   the mobile dopant is the same as or different from the first dopant;
   the mobile dopant is different from the concealed dopant;
   the mobile dopant has a diffusion constant greater than a diffusion constant of the concealed dopant; and
   one of the concealed dopant and the mobile dopant has a negative molar refractivity and the other one has a positive molar refractivity;
the optical fibre being such that:
   the concealed dopant is present in a concentration that, prior to heating, induces a change in the first refractive index profile;
   the mobile dopant is present in a concentration that, prior to heating, induces an equal and opposite change in the first refractive index profile induced by the concealed dopant;
   the first dopant is present in a concentration that has a maximum value;
   the concealed dopant is present in a concentration that has more than the maximum value; and
   heating of the optical fibre causes the mobile dopant to diffuse more quickly than the concealed dopant, thereby allowing the concealed dopant and the mobile dopant to change the first refractive index profile of the optical fibre to the second refractive index profile and so change the first optical guidance property to the second optical guidance property.

2. An optical fibre according to claim 1 wherein the disposition of the concealed dopant is in a different region of the optical fibre than the first dopant.

3. An optical fibre according to claim 1 wherein the optical fibre has a fundamental mode defined by an $M^2$ value prior to heating less than 1.15, and has a fundamental mode defined by an $M^2$ value after heating that is at least 1.2.

4. An optical fibre according to claim 3 wherein the $M^2$ value of the fundamental mode after heating that is at least 1.3.

5. An optical fibre according to claim 4 wherein the $M^2$ value of the fundamental mode after heating that is at least 1.5.

6. An optical fibre according to claim 1 wherein the optical fibre is a single mode optical fibre prior to heating, and a multimode optical fibre after heating.

7. An optical fibre according to claim 1 wherein the optical fibre is a multimode optical fibre prior to heating, and is more multimoded after heating.

8. An optical fibre according to claim 1 wherein the magnitude of a refractive index change induced by incorporating the mobile dopant into the optical fibre is greater than the difference between the refractive index of the core and the refractive index of a region surrounding the core.

9. An optical fibre according to claim 1 wherein the core supports a fundamental mode having a mode field diameter, wherein the mode field diameter after heating is greater than the mode field diameter prior to heating.

10. An optical fibre according to claim 1 wherein the concealed and mobile dopants have a disposition and a concentration such that the diffusion of the mobile dopant increases an effective mode area of a fundamental mode guided by the optical fibre.

11. An optical fibre according to claim 1 wherein the concentration and disposition of the concealed and mobile dopants are such that heating of the optical fibre causes a reduction in a refractive index of the core.

12. An optical fibre according to claim 11 wherein further heating causes the refractive index of the core to become equal to the refractive index of a region surrounding the core.

13. An optical fibre according to claim 12 wherein further heating causes the refractive index of the core to become less than the refractive index of the region surrounding the core.

14. An optical fibre according to claim 1 wherein the concentration and disposition of the concealed and mobile dopants are such that the diffusion of the mobile dopant causes an increase in the refractive index of the core.

15. An optical fibre according to claim 1 wherein the concealed and mobile dopants have a disposition and a concentration such that the diffusion of the mobile dopant decreases a mode field diameter of a fundamental mode guided by the optical fibre.

16. An optical fibre according to claim 1 and including a pedestal surrounding the core.

17. An optical fibre according to claim 1 wherein at least one of the mobile dopant and the concealed dopant is disposed in at least six longitudinally extending regions having a diameter less than 5 μm.

18. An optical fibre according to claim 1 wherein the first dopant comprises at least one lanthanide.

19. An optical fibre according to claim 18 wherein the first dopant comprises phosphorus and aluminium in equal concentrations to each other in the core.

20. An optical fibre according to claim 19 wherein the concealed dopant comprises phosphorus.

21. An optical fibre according to claim 1 wherein the concentration of the mobile dopant is at least 0.3 mol %.

22. An optical fibre according to claim 1 wherein the optical fibre comprises a plurality of cores.

23. An optical fibre according to claim 1 wherein the optical fibre comprises a plurality of regions having the second refractive index profile, the regions have a length in the range 100 μm to 1 mm, the regions having a separation in the range 100 μm to 5 mm, the optical fibre being in the form of an optical filter.

24. An optical fibre according to claim 23 wherein the regions are azimuthally asymmetric.

25. An optical fibre according to claim 1 wherein the optical fibre has an angled facet, and a core diameter of the optical fibre increases towards the angled facet.

26. An optical fibre according to claim 1 wherein the mobile dopant Is different from the first dopant.

27. An optical fibre according to claim 1 wherein the first dopant is germania and the concealed dopant is germania.

28. An optical fibre according to claim 1 wherein there are two of the first dopants.

29. An optical fibre according to claim 28 in which the two first dopants are germania and ytterbium.

30. An optical fibre according to claim 29 wherein the concealed dopant comprises germania.

31. An optical fibre according to claim 29 wherein the mobile dopant is fluorine.

32. An optical fibre device comprising a splice between a first optical fibre and a second optical fibre, wherein the splice has a loss less than 0.5 dB, and the first optical fibre has a first refractive index profile that is changeable by heating to a second refractive index profile, the first optical fibre comprising at least one core, a cladding, at least one first dopant for providing the first refractive index profile, at least one concealed dopant, and at least one mobile dopant, wherein:

the first refractive index profile has a first optical guidance property;
the second refractive index profile has a second optical guidance property;
the first optical guidance property is different from the second optical guidance property;
the core has a refractive index that is greater than a refractive index of the cladding;
the concealed dopant is the same as or different from the first dopant;
the mobile dopant is the same as or different from the first dopant;
the mobile dopant is different from the concealed dopant;
the mobile dopant has a diffusion constant greater than a diffusion constant of the concealed dopant; and
one of the concealed dopant and the mobile dopant has a negative molar refractivity and the other one has a positive molar refractivity;

the first optical fibre being such that:
the concealed dopant is present in a concentration that, prior to heating, induces a change in the first refractive index profile;
the mobile dopant is present in a concentration that, prior to heating, induces an equal and opposite change in the first refractive index profile induced by the concealed dopant;
the first dopant is present in a concentration that has a maximum value;
the concealed dopant is present in a concentration which is more than the maximum value; and
heating of the first optical fibre causes the mobile dopant to diffuse more quickly than the concealed dopant, thereby allowing the concealed dopant and the mobile dopant to change the first refractive index profile of the first optical fibre to the second refractive index profile of the first optical fibre and so chance the first optical guidance property of the first optical fibre to the second optical guidance property of the first optical fibre.

33. An optical fibre device according to claim 32, wherein the second optical fibre has a first refractive index profile that is changeable by heating to a second refractive index profile, the second optical fibre comprising at least one core, a cladding, at least one first dopant for providing the first refractive index profile, at least one concealed dopant, and at least one mobile dopant, wherein:

the first refractive Index profile has a first optical guidance property;
the second refractive index profile has a second optical guidance property;
the first optical guidance property is different from the second optical guidance property;
the core has a refractive index that is greater than a refractive index of the cladding;
the concealed dopant is the same as or different from the first dopant;
the mobile dopant is the same as or different from the first dopant;
the mobile dopant is different from the concealed dopant;
the mobile dopant has a diffusion constant greater than a diffusion constant of the concealed dopant; and
one of the concealed dopant and the mobile dopant has a negative molar refractivity and the other one has a positive molar refractivity;

the second optical fibre being such that:
the concealed dopant is present in a concentration that, prior to heating, induces a change in the first refractive index profile;
the mobile dopant is present in a concentration that, prior to heating, induces an equal and opposite change in the first refractive index profile induced by the concealed dopant;
the first dopant is present in a concentration that has a maximum value;
the concealed dopant is present in a concentration which is more than the maximum value; and
heating of the second optical fibre causes the mobile dopant to diffuse more quickly than the concealed dopant, thereby allowing the concealed dopant and the mobile dopant to change the first refractive index profile of the second optical fibre to the second refractive index profile of the second optical fibre and so change the first optical guidance property of the second optical fibre to the second optical guidance property of the second optical fibre.

34. An optical fibre device according to claim 32, wherein the second optical fibre is a microstructured optical fibre.

35. An optical fibre device according to claim 34 wherein the second optical fibre is a photonic bandgap fibre, a Kagome fibre, or a hollow core anti-resonant optical fibre.

36. An optical fibre device according to claim 32, wherein the first optical fibre and the second optical fibre have a mismatch in core diameters of at least 10 µm.

37. An optical fibre device according to claim 32 wherein the second refractive index profile is azimuthally asymmetric.

38. An optical fibre device according to claim 32 and including at least one reflector, the optical fibre device being in the form of a laser.

39. An optical fibre device according to claim 32 and including a seed laser, the optical fibre device being in the form of a master oscillator power amplifier.

40. An optical fibre device according to claim 32 wherein the mobile dopant is different from the first dopant.

41. A method for changing a first refractive index profile in an optical fibre to a second refractive index profile, wherein the optical fibre comprises at least one core, a cladding, at least one first dopant for providing the first refractive index profile, at least one concealed dopant, and at least one mobile dopant, and the optical fibre being characterized in that:
   the first refractive index profile has a first optical guidance property;
   the second refractive index profile has a second optical guidance property;
   the first optical guidance property is different from the second optical guidance property;
   the core has a refractive index that is greater than a refractive index of the cladding;
   the concealed dopant is the same as or different from the first dopant;
   the mobile dopant is the same as or different from the first dopant;
   the mobile dopant is different from the concealed dopant;
   the mobile dopant has a diffusion constant greater than a diffusion constant of the concealed dopant;
   one of the concealed dopant and the mobile dopant has a negative molar refractivity and the other one has a positive molar refractivity;
   the concealed dopant is present in a concentration that, prior to heating, induces a change in the first refractive index profile;
   the mobile dopant is present in a concentration that, prior to heating, induces an equal and opposite change in the first refractive index profile induced by the concealed dopant;
   the first dopant is present in a concentration that has a maximum value; and
   the concealed dopant is present in a concentration which is more than the maximum value,
the method comprising the steps of:
   providing the optical fibre;
   heating the optical fibre to cause the mobile dopant to diffuse more quickly than the concealed dopant; and
   allowing the concealed dopant and the mobile dopant to change the first refractive index profile of the optical fibre to the second refractive index profile and so change the first optical guidance property to the second optical guidance property.

42. A method according to claim 41 wherein the mobile dopant is different from the first dopant.

* * * * *